(12) United States Patent
Marzban et al.

(10) Patent No.: US 12,526,796 B2
(45) Date of Patent: Jan. 13, 2026

(54) CONFIGURING INTERFERENCE PREDICTION MODES

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Arumugam Chendamarai Kannan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 322 days.

(21) Appl. No.: 18/350,682

(22) Filed: Jul. 11, 2023

(65) Prior Publication Data

US 2025/0024452 A1  Jan. 16, 2025

(51) Int. Cl.
| | |
|---|---|
| *H04W 72/12* | (2023.01) |
| *H04W 72/1268* | (2023.01) |
| *H04B 17/391* | (2015.01) |
| *H04W 88/06* | (2009.01) |

(52) U.S. Cl.
CPC ..... *H04W 72/1268* (2013.01); *H04B 17/3913* (2015.01); *H04W 88/06* (2013.01)

(58) Field of Classification Search
CPC .............. H04W 72/1268; H04W 88/06; H04B 17/3913; H04B 17/345
See application file for complete search history.

(56) References Cited

U.S. PATENT DOCUMENTS

| | | | | |
|---|---|---|---|---|
| 2004/0193857 A1* | 9/2004 | Miller | ................... | G06F 9/3806 |
| | | | | 712/240 |
| 2007/0098070 A1* | 5/2007 | Saigo | ..................... | H04N 19/11 |
| | | | | 375/E7.176 |
| 2023/0007290 A1* | 1/2023 | Lim | ....................... | H04N 19/70 |
| 2023/0370181 A1* | 11/2023 | Rydén | .................. | H04B 17/336 |

\* cited by examiner

*Primary Examiner* — Lan-Huong Truong
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of an interference prediction configuration. The UE may transmit an interference prediction report based at least in part on the interference prediction configuration. Numerous other aspects are described.

28 Claims, 9 Drawing Sheets

CONFIGURING INTERFERENCE PREDICTION MODES

FIELD OF THE DISCLOSURE

Aspects of the present disclosure generally relate to wireless communication and to techniques and apparatuses for configuring interference prediction modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of an interference prediction configuration. The method may include transmitting an interference prediction report based at least in part on the interference prediction configuration.

Some aspects described herein relate to a method of wireless communication performed by a network node. The method may include transmitting an indication of an interference prediction configuration. The method may include receiving an interference prediction report based at least in part on the interference prediction configuration.

Some aspects described herein relate to an apparatus for wireless communication at a UE. The apparatus may include one or more memories and one or more processors coupled to the one or more memories. The one or more processors may be configured, individually or collectively, to receive an indication of an interference prediction configuration. The one or more processors may be configured, individually or collectively, to transmit an interference prediction report based at least in part on the interference prediction configuration.

Some aspects described herein relate to an apparatus for wireless communication at a network node. The apparatus may include one or more memories and one or more processors coupled to the one or more memories. The one or more processors may be configured, individually or collectively, to transmit an indication of an interference prediction configuration. The one or more processors may be configured, individually or collectively, to receive an interference prediction report based at least in part on the interference prediction configuration.

Some aspects described herein relate to a non-transitory computer-readable medium that stores a set of instructions for wireless communication by a UE. The set of instructions, when executed by one or more processors of the UE, may cause the UE to receive an indication of an interference prediction configuration. The set of instructions, when executed by one or more processors of the UE, may cause the UE to transmit an interference prediction report based at least in part on the interference prediction configuration.

Some aspects described herein relate to a non-transitory computer-readable medium that stores a set of instructions for wireless communication by a network node. The set of instructions, when executed by one or more processors of the network node, may cause the network node to transmit an indication of an interference prediction configuration. The set of instructions, when executed by one or more processors of the network node, may cause the network node to receive an interference prediction report based at least in part on the interference prediction configuration.

Some aspects described herein relate to an apparatus for wireless communication. The apparatus may include means for receiving an indication of an interference prediction configuration. The apparatus may include means for transmitting an interference prediction report based at least in part on the interference prediction configuration.

Some aspects described herein relate to an apparatus for wireless communication. The apparatus may include means for transmitting an indication of an interference prediction configuration. The apparatus may include means for receiving an interference prediction report based at least in part on the interference prediction configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
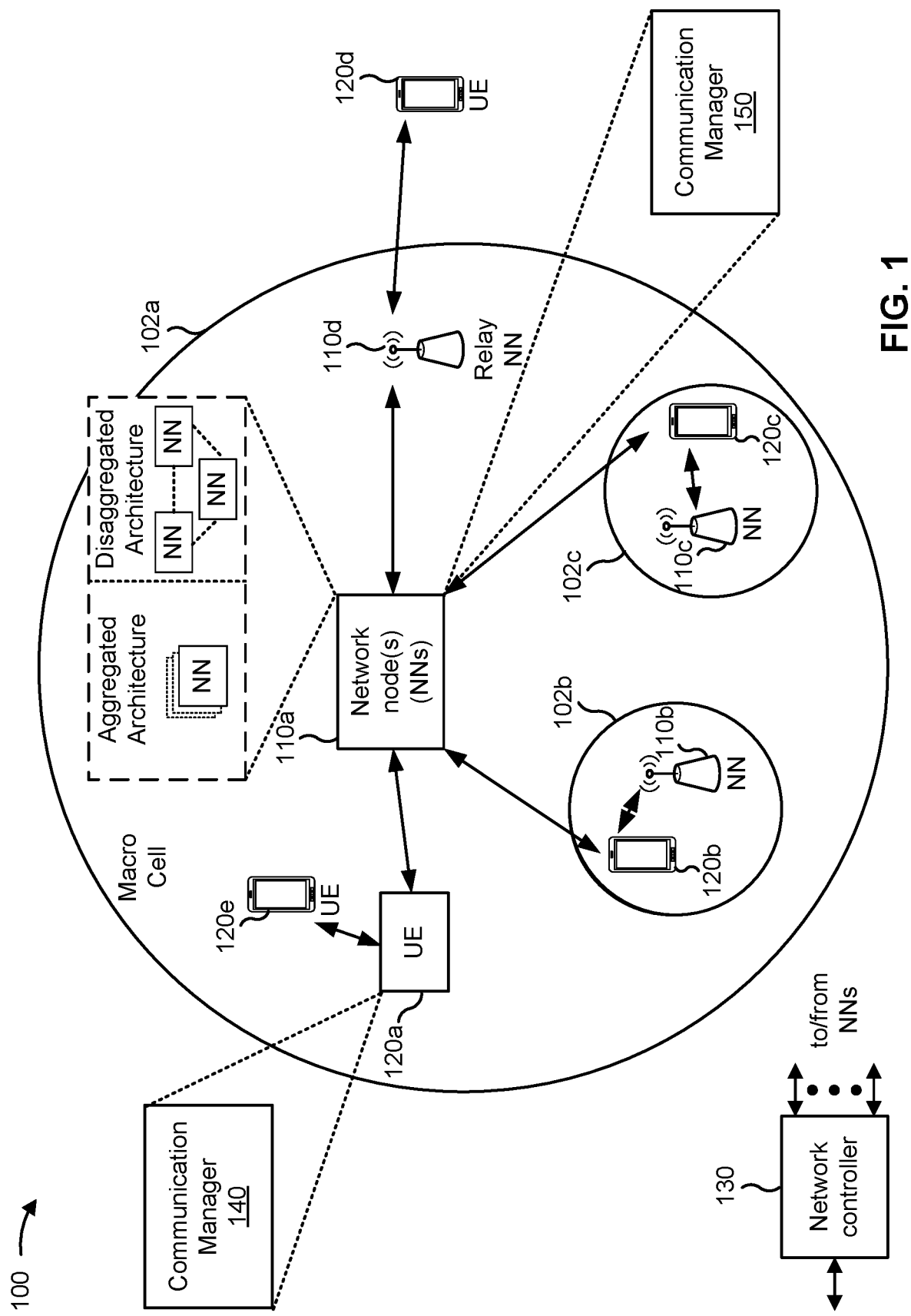
FIG. 1 is a diagram illustrating an example of a wireless network, in accordance with the present disclosure.

A network node and/or a user equipment (UE) may use current and/or prior interference metrics to predict interference on future resources. Based at least in part on obtaining predicted interference information, the network node may select a transmission configuration for a future transmission, in order to mitigate the predicted interference. The use of a single interference prediction mode to predict interference may result in inefficiencies in a wireless network. To illustrate, for some channel conditions, the single prediction mode may provide insufficient prediction information that results in the network node failing to select a transmission configuration that mitigates interference. Alternatively, or additionally, a UE operating with a low battery power level may rapidly drain power resources based at least in part on using the single interference prediction mode. Accordingly, the inability to modify an interference prediction mode may result in a reduced operating life span of a UE and/or increased effects from the interference, such as increased recovery errors, reduced data throughput, and/or increased data transfer latencies.

Various aspects described herein generally relate to configuring interference prediction modes. Some aspects more specifically relate to a network node configuring a UE to switch between interference prediction modes. In some aspects, a UE may receive an indication of an interference prediction configuration. To illustrate, the interference prediction configuration may indicate selection of an interference prediction mode and/or an interference prediction reporting configuration as described below. Based at least in part on receiving the indication of the interference prediction configuration, the UE may transmit an interference prediction report based at least in part on the interference prediction configuration. For example, the UE may switch from using a first interference prediction mode that is associated with generating a first interference prediction metric to a second interference prediction mode that is associated with generating a second interference prediction metric. Alternatively, or additionally, the UE may switch from reporting a first type of interference prediction information to reporting a second type of interference prediction information.

The ability to switch interference prediction modes, such as an interference prediction mode used by a UE to predict interference, may enable a network node to modify a type of interference prediction returned by the UE. In some aspects, the network node may select a first interference prediction mode that increases an amount of prediction information returned by the UE and enables the network node to select a transmission configuration and/or resources that mitigate interference. In other aspects, the network node may select a second interference prediction mode that reduces power consumption at the UE in order to preserve a battery life at the UE. Accordingly, the ability to modify an interference prediction mode may result in an increased operating life span of a UE, reduced recovery errors, increased data throughput, and/or decreased data transfer latencies.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memory components) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive an indication of an interference prediction configuration, and transmit an interference prediction report based at least in part on the interference prediction configuration. Additionally, or alternatively, the communication manager 140 may perform one or more other operations described herein.

In some aspects, a network node (e.g., a network node 110) may include a communication manager 150. As described in more detail elsewhere herein, the communication manager 150 may transmit an indication of an interference prediction configuration, and receive an interference prediction report based at least in part on the interference prediction configuration. Additionally, or alternatively, the communication manager 150 may perform one or more other operations described herein.

As indicated above, FIG. 1 is provided as an example. Other examples may differ from what is described with regard to FIG. 1.

Figure 2:
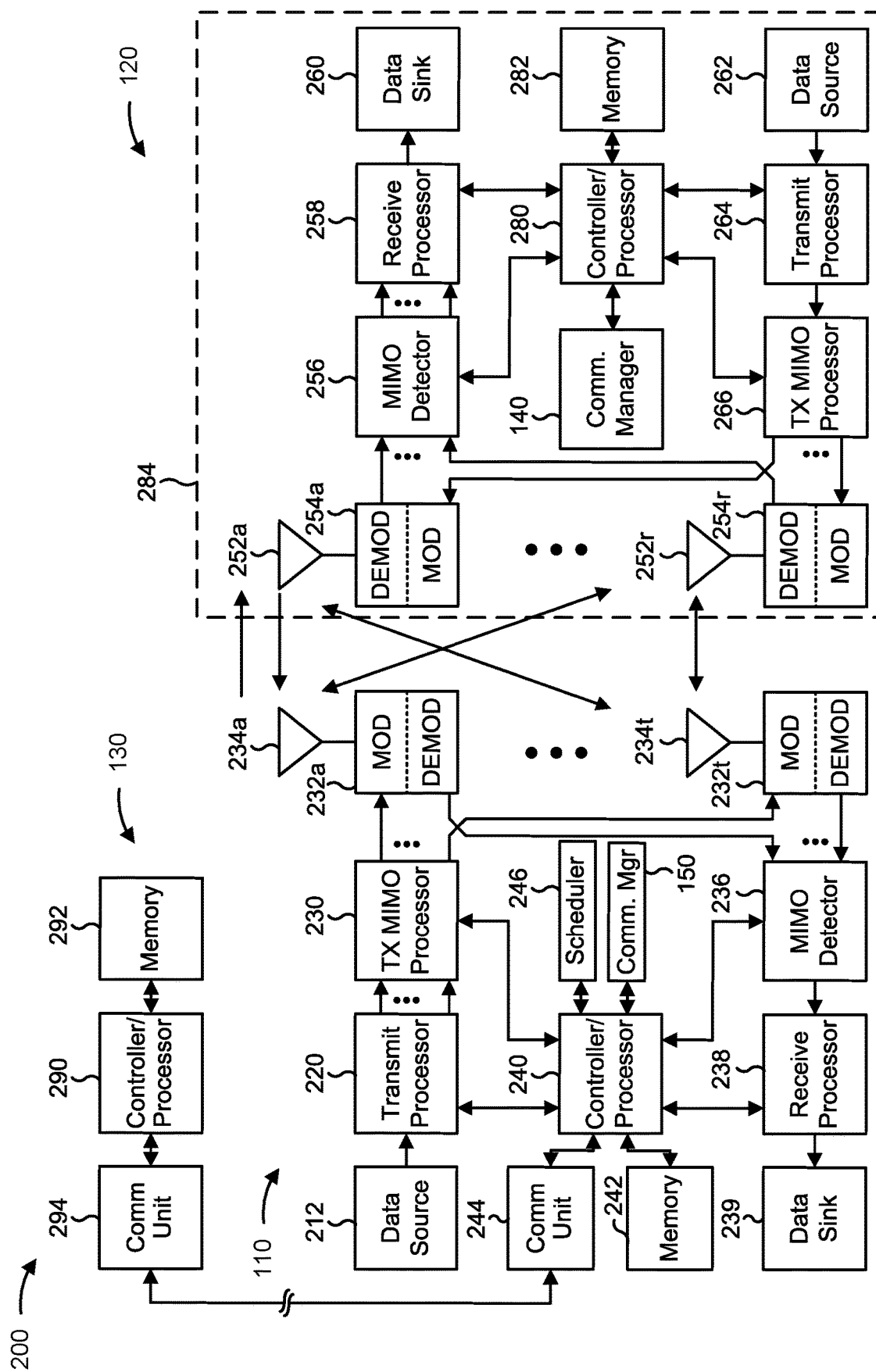
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. For visual clarity, FIG. 2 shows the memory 292 as a single memory, but other examples of the memory 292 may include multiple memories (e.g., two or more memory components). The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 25+4 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and a memory 282 to perform aspects of any of the methods described herein (e.g., with reference to FIGS. 4A-9). For visual clarity, FIG. 2 shows the memory 282 as a single memory, but other examples of the memory 282 may include multiple memories (e.g., two or more memory components).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and a memory 242 to perform aspects of any of the methods described herein (e.g., with reference to FIGS. 4A-9). For visual clarity, FIG. 2 shows the memory 242 as a single memory, but other examples of the memory 242 may include multiple memories (e.g., two or more memory components).

The controller/processor 240 of the network node 110, the controller/processor 280 of the UE 120, and/or any other component(s) of FIG. 2 may perform one or more techniques associated with configuring interference prediction modes, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving an indication of an interference prediction configuration; and/or means for transmitting an interference prediction report based at least in part on the interference prediction configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for transmitting an indication of an interference prediction configuration; and/or means for receiving an interference prediction report based at least in part on the interference prediction configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
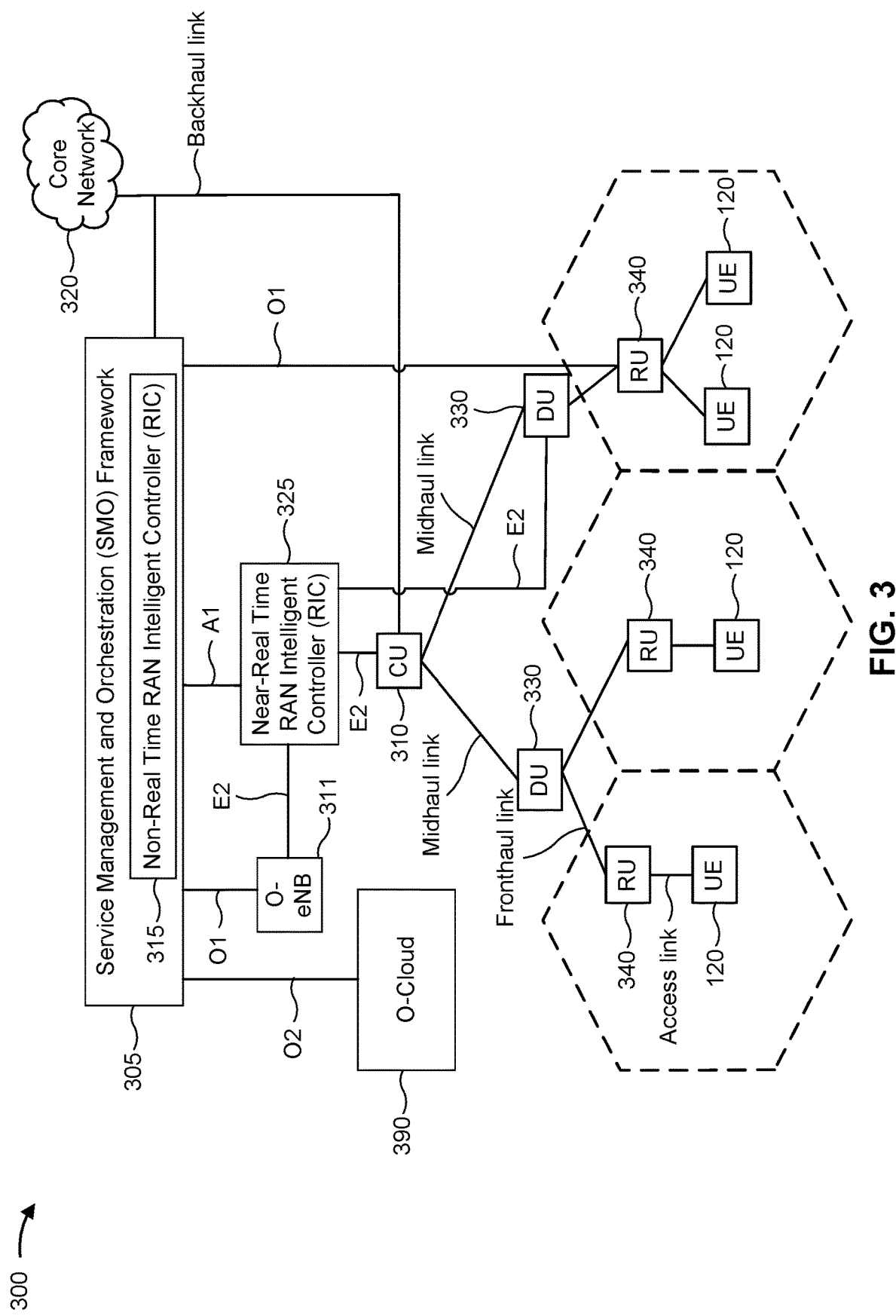
FIG. 3 is a diagram illustrating an example disaggregated base station architecture, in accordance with the present disclosure.
Figure 4:
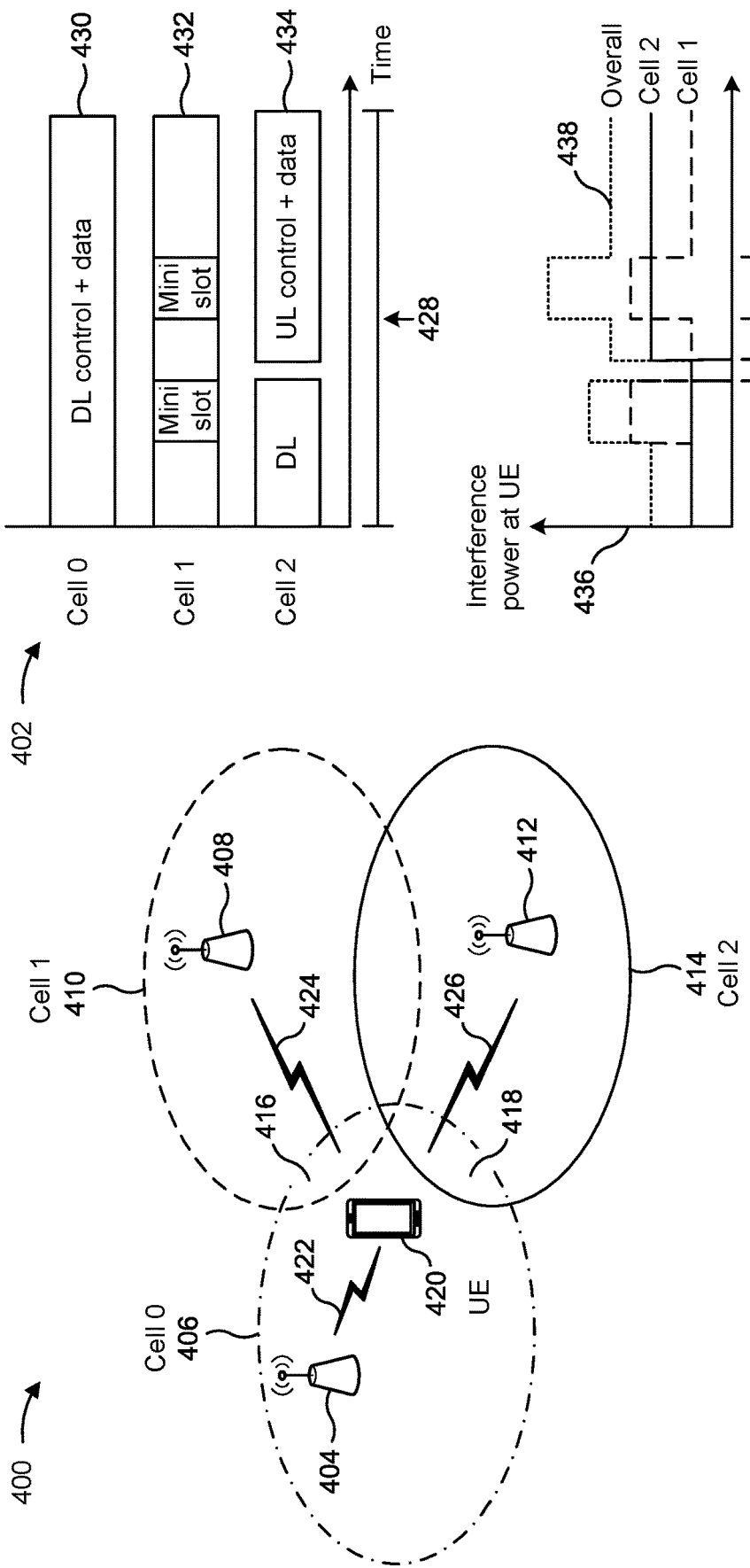
FIGS. 4A and 4B are diagrams illustrating a first example and a second example, respectively, of inter-network-node interference, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A and 4B are diagrams illustrating a first example 400 and a second example 402, respectively, of inter-base station interference (e.g., inter-gNB interference), in accordance with the present disclosure.

In the first example 400, a first network node 404 (e.g., a first network node 110) may provide wireless services over a first cell coverage area 406 (indicated in FIG. 4A by a dash-dotted line, and shown as Cell 0), a second network node 408 (e.g., a second network node 110) may provide wireless services over a second cell coverage area 410 (indicated in FIG. 4A by a dashed line, and shown as Cell 1), and a third network node 412 (e.g., a third network node 110) may provide wireless services over a third cell coverage area 414 (indicated in FIG. 4A by a solid line, and shown as Cell 2). In some aspects, the network node 404 and the network node 408 may be considered neighboring network nodes based at least in part on having adjacent cell borders, overlapping cell coverage areas (e.g., region 416), and/or being located within a threshold distance of one another. Alternatively or additionally, the network node 404 and the network node 408 may be considered neighboring network nodes based at least in part on determining that an interference power level, detected by one of the network nodes based at least in part on a signal from the other network node, satisfies a power-level threshold value, and/or based at least in part on receiving information from a core network and/or a stored file that indicates the two network nodes are neighboring network nodes. Similarly, the network node 404 and the network node 412 may be considered neighboring network nodes based at least in part on, for example, having overlapping cell coverage areas (e.g., region 418).

A UE located within a cell coverage area of a network node may access the services provided by the network node using one or more wireless signals. To illustrate, the network node 404 may provide services to a UE 420 (e.g., the UE 120) located within the cell coverage area 406 using a wireless signal 422. For example, the network node 404 may transmit, as the wireless signal 422, a downlink signal to the UE 420. However, the UE 420 may receive a distorted downlink signal that corresponds to the downlink signal transmitted by the network node 404 and interference caused by additional signals, such as one or more wireless signals 424 associated with the network node 408 and/or one or more wireless signals 426 associated with the network node 412. The wireless signals 424 and 426 may be associated with any combination of UL and/or DL communications in the respective cell coverage areas.

In some aspects, signal interference distorts and/or modifies a particular signal. As one example, the wireless signal 422 may be considered a wireless signal directed to and/or intended for the UE 420 (e.g., the network node 404 generates the wireless signal 422 based at least in part on a communication directed to at least the UE 420). As another example, the wireless signal 422 may be intended for multiple UEs, such as a group of UEs or all UEs in the first cell coverage area 406. The wireless signals 424 and 426, however, may be directed to, intended for, and/or associated with other UEs (not shown in FIG. 4A) operating in the respective cell coverage areas 410 and 414 of the network node 408 and the network node 412. Because the wireless signals 424 and 426 are directed to, intended for, and/or are associated with other UEs (and not the UE 420), the UE 420 may receive at least portions of the wireless signals 424 and 426 as distortion and/or noise to the wireless signal 422, which may cause recovery errors, reduce data throughput, and/or increase data-transfer latency at the UE 420. In some aspects, inter-network-node interference and/or inter-base-station interference denotes distortion to a first signal associated with a first network node, where the distortion originates from a second signal associated with a second network node. For instance, the first signal may be directed to and/or intended for a first UE, and the second signal may be directed to and/or intended for a different device (e.g., another UE and/or a network node). As used herein, "distortion" can include noise or any other modification of a first signal, as caused by one or more second signals, as experienced by a recipient of the first signal. For example, inter-network-node interference may include noise due to the second signal as experienced by the UE 420 receiving the first signal.

To illustrate, and as shown by FIG. 4B in the example 402, the network node 404 may transmit, to the UE 420 and using the wireless signal 422, DL control information and/or data over a time duration 428 as shown by reference number 430. In some aspects, the network node 404 may generate the wireless signal 422 based at least in part on DL control information and/or data that is directed to and/or is intended for at least the UE 420. As shown by reference number 432, the neighboring network node 408 may also transmit within the time duration 428. For example, the network node 408 may use the wireless signals(s) 424 to transmit control information and/or data within two mini-slot time durations (e.g., transmit to another network node, to a UE, to a satellite), shown within the time duration as "Mini slot." Similarly, and as shown by reference number 434, the neighboring network node 412 may communicate within the time duration. For example, the network node 412 may use the wireless signal(s) 426 to transmit DL control information and/or user data in a first portion of the time duration 428 and receive UL control information and/or data over a second portion of the time duration 428 (e.g., transmit to or receive from another network node, a UE, or a satellite).

Graph 436 illustrates example interference power received by the UE 420 over the time duration 428 and based at least in part on the transmissions shown by the reference numbers 432 and 434. As shown by reference number 438, an overall interference power level may be considered the combined interference power of the interference signals transmitted by the network node 408 and the network node 412. The overall interference power may vary over the time duration 428 based at least in part on the different transmission configurations of the interference signals. To illustrate, interference received by the UE 420 over a first time duration 440 may be significantly less than interference received by the UE 420 over a second time duration 442.

Various network factors may affect an amount and/or duration of interference observed by a device (e.g., a UE 120 and/or a network node 110). To illustrate, a load size (e.g., a number of UEs) supported by a network node and/or resource utilization by the network node to support the load size may cause a variation in the interference as the load size and/or resource utilization changes. That is, the load size and/or resource utilization may affect a spatial sparsity and/or rank of interference observed by a device. Other network factors may include, by way of example and not of limitation, a number of active UEs (e.g., within a cell area and/or near the device), a number of beams and/or a number of transmission configuration indication (TCI) states actively being used within the cell area and/or near the device, and/or a respective elevation and/or a respective azimuth angle of the respective beam. Alternatively, or additionally, some transmissions may lead to periodic interference, such as configured grant transmissions, semi-persistent scheduling transmissions, and/or reference signal transmissions.

Some RATs, such as NR, may allow devices additional flexibility in transmission configurations relative to prior RATs (e.g., LTE), such as variable time-slot sizes (e.g., full slot, mini-slot, multi-slot), unscheduled transmissions (e.g., without a grant), arbitrary start symbols (e.g., enhanced Mobile Broadband (eMBB) transmissions), punctured transmissions (e.g., a first transmission interrupted by a second transmission over a same frequency and/or time air interface resource), adaptive reference signal patterns (e.g., varying transmission patterns based on antenna ports, Doppler spread, and/or delay tolerance at a receiver), variable beam pair links (BPLs), changing beam directions, and so forth. This flexibility may cause bursty interference, as shown by the overall interference power level shown by reference number 438. In some aspects, bursty interference denotes dynamically changing interference that varies over short time durations. To illustrate, bursty interference may be considered interference that has multiple power level changes over a time duration, where the power levels may fluctuate more than a threshold value multiple times over multiple time partitions within the time duration. Bursty interference may be difficult to measure and, subsequently, difficult to mitigate (e.g., compensate for at a receiver). In some aspects, the first network node may transmit an indication of interference to the second network node, such as an overload indicator (OI), when a specific resource block (RB) has interference and/or may transmit a high interference indicator (HII) that indicates RBs used by UEs close to a boundary between the network nodes. However, and similar to measuring bursty interference, these indicators may lack detail, and thus may not enable the second network node to mitigate the bursty interference. Thus, bursty interference, such as inter-network-node interference as shown by the examples 400 and 402, may result in increased recovery errors at a receiver, reduced data throughput, and/or increased data-transfer latency.

In some aspects, a network node 110 and/or a UE 120 may use current and/or prior interference metrics (e.g., via a zero power (ZP) channel state information (CSI) reference signal (RS) and/or signal-to-interference-plus-noise ratio (SINR)) to predict the interference on future resources. For instance, the network node 110 and/or the UE 120 may generate an interference metric that is based at least in part on a resource (e.g., an air interface resource that is characterized based at least in part on frequency, time, and/or a beam). In some aspects, the network node 110 and/or UE 120 may store multiple interference metrics that span different resources and/or time slots. Alternatively, or additionally, the network node 110 and/or UE 120 may store one or more network factors associated with the interference metric(s).

To predict interference, the network node 110 and/or UE 120 may analyze the interference metric(s), network factors, and/or current operating conditions (e.g., one or more channel conditions and/or one or more transmission configurations) to identify an interference pattern. As one example, and as described below, the network node 110 and/or the UE 120 may use a machine learning model to analyze the interference and predict interference. The network node 110 may subsequently select a configuration (e.g., an MCS, a rank, and/or a resource) for a future transmission (e.g., a physical downlink shared channel (PDSCH) transmission and/or a physical uplink shared channel (PUSCH) transmission) to mitigate the predicted interference. To illustrate, the network node 110 may refrain from selecting a first resource that is predicted to include high interference for a transmission configuration and may instead select a second resource that is predicted to have low interference for the transmission configuration. In some aspects, the network node may determine the high interference and/or the low interference based at least in part on a threshold. Alternatively, or additionally, the network node 110 may select an MCS and/or rank for the transmission configuration that is configured to mitigate interference. Other examples may include the network node 110 modifying a transmission configuration that is associated with a reference signal.

The characteristics of an interference pattern may differ from the characteristics of a communication channel based at least in part on various network factors as described above. Accordingly, information about future interference and/or predicted interference information may enable a network node to mitigate the interference, such as by selecting resources with less interference relative to other resources and/or selecting an MCS that is more robust in the presence of interference. In some aspects, a network node 110 and/or a UE 120 may predict interference based at least in part on a machine learning model. To illustrate, interference observed by a UE 120 may be the result of multiple network factors, and the multiple network factors may make modeling the interference via a fixed-programming algorithm complex (e.g., multiple lines of code, multiple switch statements, multiple mathematical computations, and/or multiple qualifying statements). As an alternative to a fixed-programming algorithm, a machine learning algorithm may analyze interference metrics and/or associated network factors to generate a machine learning model that predicts interference. To illustrate, a machine learning model may be trained to predict an interference autocorrelation ($R_{nn}$) matrix that indicates a similarity between observed interference and a delayed copy of the interference.

Different devices in a wireless network may use a machine learning model to predict interference. As one example, a network node 110 may predict interference based at least in part on a machine learning model and, in a second example, a UE 120 may predict interference and/or indicate the predicted interference to the network node 110. Implementing an interference prediction machine learning model at the network node 110 may provide the network node with access to the predicted interference information without incurring additional signaling overhead and/or may preserve power at a UE 120 (e.g., by having the network node perform the interference prediction processing). In some aspects, the network node 110 may acquire more interference information relative to a single UE and, subsequently, provide for more machine learning model training. Implementing an interference prediction machine learning model at a UE (e.g., a UE 120) may provide more interference information specific to the UE to use in training the machine learning model. To illustrate, the UE 120 may generate more interference metrics and/or signal metrics than are transmitted to the network node 110. Accordingly, the UE 120 may have access to more UE-specific interference metrics relative to the network node, and the UE-specific interference metrics may be used to customize the machine learning model to the specific UE 120.

Machine learning models and/or fixed-programming algorithms may be configured to perform interference prediction in a variety of manners. For instance, a first interference prediction mode that may be used by a device (e.g., via a machine learning model and/or a fixed-programming algorithm) to generate an interference prediction is an interference $R_{nn}$ prediction mode that is associated with generating and/or predicting a symmetric positive definite $R_{nn}$ matrix. A second interference prediction mode that may be used by a device to generate an interference prediction is a diagonal $R_{nn}$ prediction mode and/or spatial $R_{nn}$ prediction mode that is associated with generating and/or predicting the diagonal elements of an $R_{nn}$ matrix. Alternatively, or additionally, a third interference prediction mode that may be used by a device to generate an interference prediction is an interference power prediction mode (e.g., a trace prediction mode that generates a trace of the $R_{nn}$ matrix) and/or an SINR prediction mode. Each interference prediction mode may provide different benefits. As one example, the first interference prediction mode may provide more information relative to the second interference prediction mode and/or the third interference prediction mode. To illustrate, the first interference prediction mode may result in respective interference correlation information for each of multiple data streams and/or spatial correlation information associated with the interference. As another example, the third interference prediction mode may be associated with a lower complexity (e.g., less processing) and/or result in less power consumption at a device (e.g., a UE 120 and/or a network node 110) relative to the first interference prediction mode and/or the second interference prediction mode. In some aspects, the third interference prediction mode may report less information relative to the first interference prediction mode and/or second interference prediction mode, resulting in less signaling overhead. As yet another example, the second interference prediction mode may include additional information relative to the third interference prediction mode, such as respective interference strength on different spatial streams, using less reporting overhead relative to the first interference prediction mode.

In some aspects, the use of a single interference prediction mode to predict interference may result in inefficiencies in a wireless network. To illustrate, for some channel conditions, the third interference prediction mode may provide insufficient prediction information, resulting in the network node failing to select a transmission configuration and/or resources that mitigate interference. Alternatively, or additionally, a UE operating with a low battery power level may rapidly drain power resources based at least in part on using the first interference prediction mode as the single interference prediction mode. Accordingly, the inability to modify an interference prediction mode may result a reduced battery life of a UE and/or increased effects from the interference, such as increased recovery errors, reduced data throughput, and/or increased data transfer latencies.

Some techniques and apparatuses described herein provide configuring interference prediction modes. In some aspects, a UE may receive an indication of an interference prediction configuration. To illustrate, the interference prediction configuration may indicate selection of an interference prediction mode and/or an interference prediction reporting configuration, as described below. Based at least in part on receiving the indication of the interference prediction configuration, the UE may transmit an interference prediction report based at least in part on the interference prediction configuration. For example, the UE may switch from a first interference prediction mode that is associated with generating a first interference prediction metric to a second prediction mode that is associated with generating a second interference prediction metric. Alternatively, or additionally, the UE may report interference prediction(s) based at least in part on the interference prediction configuration.

In some aspects, a network node may transmit an indication of an interference prediction configuration, such as to a UE and/or to another network node in communication with the UE. Based at least in part on transmitting the indication, the network node may receive an interference prediction report that is based at least in part on the interference prediction configuration. The network node may select a transmission configuration that mitigates interference based at least in part on the interference prediction report.

The ability to adapt an interference prediction mode, such as an interference prediction mode used by a UE to predict interference, may enable a network node to modify a type of interference prediction returned by the UE. In some aspects, the network node may select a first interference prediction mode that increases an amount of prediction information returned by the UE and enables the network node to select a transmission configuration and/or resources that mitigate interference. In other aspects, the network node may select a different interference prediction mode (e.g., the second interference prediction mode and/or the third interference prediction mode as described above) that reduces power consumption at the UE to preserve a battery life at the UE. Accordingly, the ability to modify an interference prediction mode may result in an increased operating life span of a UE, reduced recovery errors, increased data throughput, and/or decreased data transfer latencies.

As indicated above, FIGS. 4A and 4B are provided as examples. Other examples may differ from what is described with regard to FIGS. 4A and 4B.

Figure 5:
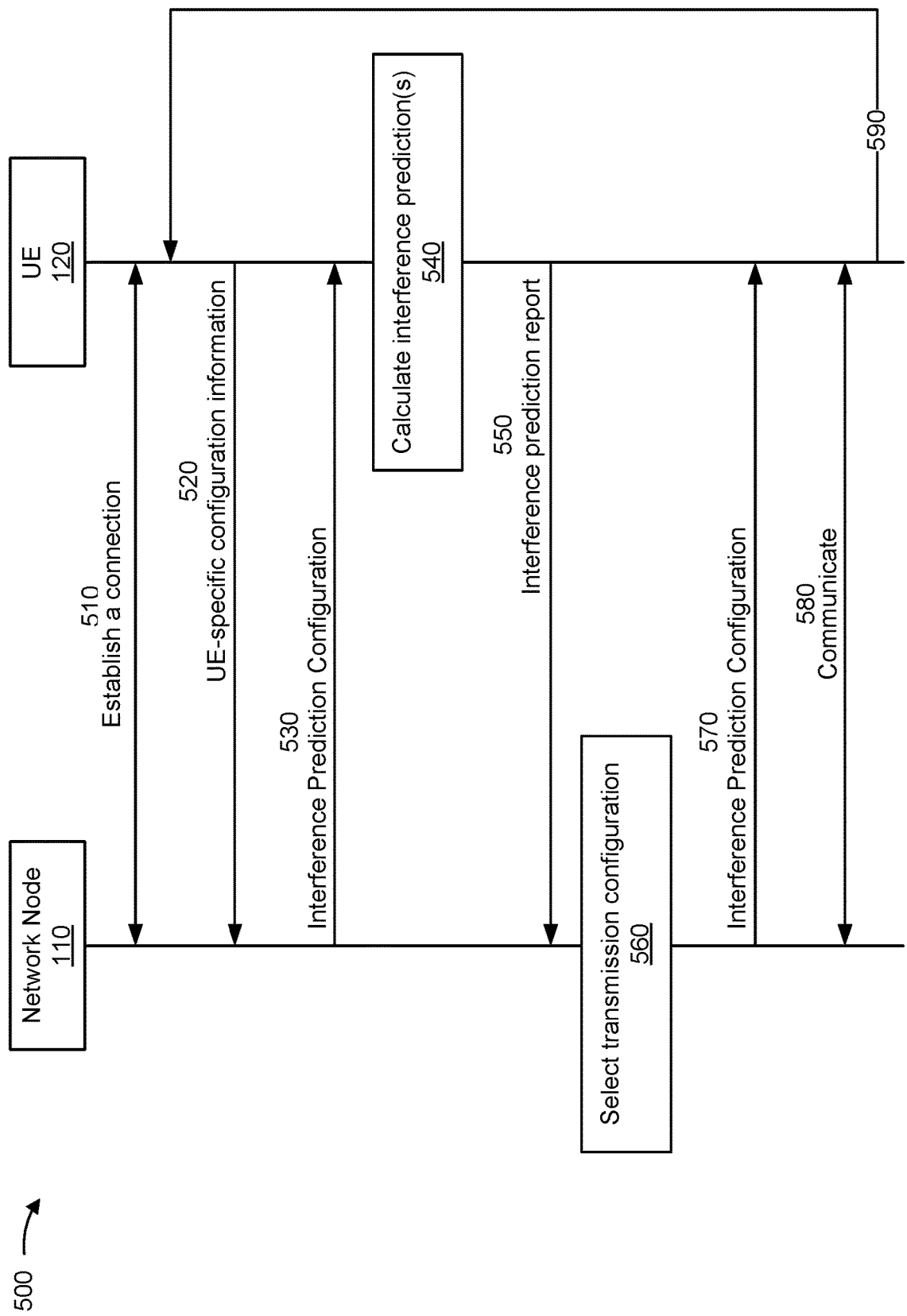
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 and a UE 120 may establish a connection. For example, the UE 120 may power up in a coverage area provided by the network node 110 and may establish a link with the network node 110, such as by performing a registration procedure. As another example, the UE 120 may perform a handover to the network node 110.

As shown by reference number 520, the UE 120 may transmit, and the network node may receive, UE-specific configuration information, such as one or more UE-supported interference prediction capabilities (e.g., a supported interference prediction mode) and/or a UE-selected interference prediction mode. For instance, the UE 120 may transmit UE capability information that indicates UE-supported interference prediction capabilities as part of a registration procedure, autonomously, and/or based at least in part on receiving a request for the UE capability information. In some aspects, the UE 120 may indicate a respective capability and/or supported configuration for each supported interference prediction mode. That is, the UE 120 may indicate a supported interference prediction mode and one or more configurations associated with the supported interference prediction mode. As one example, the UE 120 may report a recommendation and/or a capability for a number of interference measurements (e.g., a minimum number of interference measurements) that the UE 120 uses to predict interference prediction on a future resources. As another example, the UE 120 may report a recommendation and/or a capability for a maximum duration the UE 120 supports for predicting interference. In some aspects, the number of interference measurements used by the UE 120 and/or the maximum duration may vary based at least in part on an interference prediction mode and/or an machine learning model. Accordingly, the UE 120 may indicate a configuration associated with the supported interference prediction mode. In some aspects, the UE 120 may select and/or indicate a UE-selected interference prediction mode.

To illustrate, the network node 110 may instruct and/or configure the UE 120 to generate one or more signal metrics (e.g., RSRP, SINR, CSI, and/or RSSI) and/or one or more interference predictions as part of establishing the connection and/or as part of the registration procedure. Alternatively, or additionally, the UE 120 may autonomously generate the signal metric(s) and/or interference prediction(s), such as by using an initial, current, and/or default interference prediction mode via a machine learning model and/or a fixed-programming algorithm. Based at least in part on the signal metric(s) and/or interference prediction(s), the UE 120 may select a UE-selected interference prediction mode. The UE 120 may indicate the UE-selected interference prediction mode using any combination of Layer 1 signaling (e.g., uplink control information (UCI)), Layer 2 signaling (e.g., a MAC control element (CE)) and/or Layer 3 signaling (e.g., RRC signaling). As one example, the UE 120 may indicate an initial UE-selected interference prediction mode in Layer 3 signaling, and an updated UE-selected interference prediction mode in Layer 1 signaling and/or Layer 2 signaling in a subsequent iteration as described with regard to reference number 590. Accordingly, the UE 120 may indicate a UE-selected interference prediction mode and/or an updated UE-selected interference prediction mode based at least in part on using multiple signaling mechanisms.

As shown by reference number 530, the network node 110 may transmit, and the UE 120 may receive, an interference prediction configuration. In some aspects, the interference prediction configuration may indicate selection of an interference prediction mode, such as a trace prediction mode that is based at least in part on calculating a summation of the diagonal elements of the interference $R_{nn}$ matrix, a diagonal interference $R_{nn}$ matrix prediction mode that is based at least in part on reporting diagonal elements of an interference $R_{nn}$ matrix, and/or a full interference $R_{nn}$ matrix prediction mode that is based at least in part on reporting an entirety of the interference $R_{nn}$ matrix. The network node 110 may select the interference prediction mode based at least in part on a UE-supported interference prediction capability associated with the UE 120, a UE-selected interference prediction mode indicated by the UE 120, and/or one or more interference metrics indicated by the UE 120. Alternatively, or additionally, the network node 110 may select the interference prediction mode based at least in part on one or more prior interference prediction modes used by other UE(s) with commensurate (e.g., within a threshold) operating characteristics as the UE 120 (e.g., a location, a signal quality, and/or UE-supported interference prediction capabilities). In some aspects, the network node 110 may select the interference prediction mode based at least in part on an operating condition at the UE 120, such as a battery power level, as described below.

In some aspects, and with regard to reference number 590, the network node 110 may configure the UE 120 to switch from using a first interference prediction mode to using a second interference prediction mode. For instance, the network node 110 may initially configure the UE 120 with a full interference $R_{nn}$ matrix prediction mode that indicates more information relative to other interference prediction modes. For example, the network node 110 may initially configure the UE 120 to use the full interference $R_{nn}$ matrix prediction mode that results in the UE 120 returning an entirety of the interference $R_{nn}$ matrix. In some aspects, the entirety of the interference $R_{nn}$ matrix indicates a respective interference power level for each of multiple different spatial streams and/or one or more interference correlation metrics associated with the different spatial streams. In a subsequent iteration, the network node 110 may configure the UE 120 to switch to a different interference prediction mode, such as a diagonal interference $R_{nn}$ matrix prediction mode and/or a trace prediction mode, that is associated with the UE 120 transmitting and/or the network node 110 receiving less information relative to the full interference $R_{nn}$ matrix prediction mode. For instance, the network node 110 may configure the UE 120 to switch to the trace prediction mode based at least in part on a battery power level satisfying a low power threshold and/or reducing power consumption at the UE 120. Switching the UE 120 to the trace prediction mode may reduce an amount of information generated and/or transmitted by the UE 120 and, subsequently, result in less signaling overhead and/or reduced power consumption at the UE 120 relative to the full interference $R_{nn}$ matrix prediction mode and the diagonal interference $R_{nn}$ matrix prediction mode. Alternatively, or additionally, the network node 110 may configure the UE 120 to switch to the diagonal interference $R_{nn}$ matrix prediction mode to reduce signaling overhead (e.g., relative to the full interference $R_{nn}$ matrix prediction mode). The diagonal interference $R_{nn}$ matrix prediction mode may result in the UE 120 indicating a respective interference strength on different spatial streams (e.g., the diagonal elements of the interference $R_{nn}$ matrix), but not the interference correlation metric(s) associated with the different spatial streams (e.g., the off-diagonal elements of the interference $R_{nn}$ matrix).

In some aspects, the interference prediction configuration may indicate a switching threshold that is associated with switching from a first interference prediction mode to a second interference prediction mode. For example, the network node 110 may indicate a first switching threshold that is associated with a sum of absolute values of off-diagonal elements of an interference $R_{nn}$ matrix and/or a second switching threshold associated with a maximum difference between the diagonal elements of the interference $R_{nn}$ matrix. Accordingly, the UE 120 may generate an interference $R_{nn}$ matrix (e.g., a full interference $R_{nn}$ matrix), calculate the sum of absolute values as a first value and/or the maximum difference as a second value, and determine a type of interference prediction to report based at least in part on the respective switching threshold. To illustrate, the UE 120 may calculate the first value and determine that the first value satisfies the first switching threshold. Based at least in part on the first value satisfying the first switching threshold, the UE 120 may determine to report an entirety of the interference $R_{nn}$ matrix as described with regard to reference number 540 and/or reference number 550. Alternatively, or additionally, the UE 120 may determine to report only the diagonal elements of the interference $R_{nn}$ matrix based at least in part on the first value failing to satisfy the first switching threshold. As another example, the UE 120 may determine to report a trace interference prediction based at least in part on the second value failing to satisfy the second switching threshold, and/or may determine to report either diagonal interference $R_{nn}$ matrix information or full interference $R_{nn}$ matrix information based at least in part on the second value satisfying the second switching threshold. Accordingly, the network node 110 may indicate one or more switching thresholds as at least part of the interference prediction configuration.

In some aspects, the interference prediction configuration may indicate an interference reporting configuration that is associated with reporting one or more interference predictions (e.g., an estimation of interference in a resource and/or a predicted interference power metric) and/or interference $R_{nn}$ matrix information. For instance, the interference prediction configuration may indicate a first reporting configuration for an interference prediction report that indicates one or more interference prediction(s). As described above, an interference prediction may enable the network node 110 to select a transmission configuration that mitigates interference. Alternatively, or additionally, the interference prediction configuration may indicate a second reporting configuration for reporting an interference $R_{nn}$ matrix report that is associated with information about the interference $R_{nn}$ matrix (e.g., an interference matrix reporting configuration). An interference $R_{nn}$ matrix report may enable the network node 110 to select an interference prediction configuration that reduces signaling overhead and/or reduces power consumption at the UE 120.

The network node 110 may indicate, via the interference reporting configuration, to return a correlation metric associated with the interference $R_{nn}$ matrix. In some aspects, the correlation metric may provide an indication of the correlation between different spatial streams, and the network node 110 may use the correlation metric to select an updated interference prediction configuration. For instance, based at least in part on the UE 120 indicating a correlation metric that satisfies a low correlation threshold (e.g., that indicates that different spatial streams have low correlation), the network node 110 may configure the UE 120 (e.g., via the interference prediction reporting configuration) to return diagonal elements of the interference $R_{nn}$ matrix to reduce power consumption at the UE 120 and/or reduce signaling overhead. For instance, the network node 110 may indicate a trigger event that instructs the UE 120 to use a diagonal interference $R_{nn}$ matrix prediction mode and/or to report diagonal interference $R_{nn}$ prediction information based at least in part on detecting that a correlation metric satisfies a low correlation threshold.

Alternatively, or additionally, the trigger event may instruct the UE 120 to use a full interference $R_{nn}$ prediction mode and/or to report the full interference $R_{nn}$ matrix based at least in part on the correlation metric failing to satisfy the low correlation threshold. In some aspects, the correlation metric failing to satisfy the low correlation threshold indicates that correlation exists between the different data streams, and the network node 110 may configure the UE 120 to return full interference $R_{nn}$ matrix information.

As another example, the trigger event may instruct the UE 120 to use a full interference $R_{nn}$ prediction mode and/or to report the full interference $R_{nn}$ matrix based at least in part on the condition number failing to satisfy a low condition number threshold. To illustrate, a condition number may indicate a sensitivity of a matrix to changes or perturbations. For instance, a first condition number that satisfies the low condition number threshold may indicate that a small change in the input may result in a small change in the output, and/or a second condition number that fails to satisfy the low condition number threshold may indicate that a small changes to the input may result in a substantial change in the output (e.g., a change large enough to affect an accuracy of computations associated with the matrix). However, for a symmetric positive definite matrix (e.g., an interference $R_{nn}$ matrix), a low condition number that satisfies the low condition number threshold may indicate that the associated matrix is a near-diagonal matrix and/or a high condition number that fails to satisfy the low condition number threshold may indicate that the associated matrix is a non-diagonal matrix. Accordingly, the network node 110 may configure the UE 120 with a trigger event that is associated with the condition number as described above.

In some aspects the network node 110 may configure one or more parameters used by the UE 120 to report one or more interference prediction(s). To illustrate, the interference reporting configuration may specify a reporting period and/or a reporting duration (e.g., a periodicity) for reporting interference prediction(s), such as a predicted interference power metric, a full interference $R_{nn}$ matrix, diagonal elements of the interference $R_{nn}$ matrix, and/or a trace interference prediction that is based at least in part on the interference $R_{nn}$ matrix. Alternatively, or additionally, the interference reporting configuration may report multiple reporting periods and/or multiple reporting durations, and each reporting period and/or reporting duration may be associated with a respective interference prediction report, a respective interference prediction metric, and/or respective $R_{nn}$ matrix information. As one example, the network node 110 may indicate, by way of the interference reporting configuration, a first reporting period for reporting a predicted interference power metric, a second reporting period for reporting a predicted interference correlation metric, a third reporting period for reporting diagonal elements of the interference $R_{nn}$ matrix, and/or a fourth reporting period for reporting an entirety of the interference $R_{nn}$ matrix. To illustrate, an amount of change and/or a rate of change in an interference spatial correlation (e.g., off-diagonal elements of the $R_{nn}$) may be less and/or slower relative to interference power variations (e.g., over one or more spatial streams). For example, based at least in part on the change in an interference spatial correlation being slower and/or less over a duration relative to the predicted interference power metric over the same duration, the network node 110 may determine to process the interference spatial correlation metric as being constant (e.g., until receiving an updated spatial correlation metric) over the duration while receiving multiple predicted interference power metrics over the duration. Accordingly, the network node 110 may indicate a first reporting period for reporting a predicted interference power metric that has a shorter duration relative to a second reporting period for reporting the predicted interference correlation metric. That is, the network node 110 may configure the UE 120 to report the predicted interference power metric more frequently than the predicted interference correlation metric.

The interference reporting configuration may indicate to return a multiple part (multi-part) interference report. "Multi-part interference report" may denote a report that is segmented into multiple partitions, and each partition may be associated with a respective transmission. To illustrate, a UE may transmit each respective partition in a respective transmission. In some aspects, a multi-part interference report may include one or more partitions that are associated with reporting predicted interference power metrics and/or one or more partitions that are associated with reporting interference $R_{nn}$ matrix information. For example, the interference reporting configuration may indicate to return, as at least part of a first report and/or a first partition of the multi-part interference report, predicted interference power metrics, diagonal elements of an interference $R_{nn}$ matrix, and/or a trace interference prediction that is associated with the interference $R_{nn}$ matrix. Alternatively, or additionally, the interference reporting configuration may indicate to return, as at least part of a second report and/or a second partition of the multi-part interference report, a spatial correlation of interference associated with different spatial streams (e.g., off-diagonal elements of the interference $R_{nn}$ matrix).

In some aspects, the interference reporting configuration may indicate to return each report based at least in part on a respective periodicity, a respective trigger event, and/or a respective spatial stream. For instance, the interference reporting configuration may specify to return a first report that is associated with one or more predicted interference power metrics at a first periodicity and/or a second report that is associated with one or more predicted interference correlation metrics at a second periodicity, as described above. Alternatively, or additionally, the interference reporting configuration may indicate to return the first report based at least in part on a first spatial stream (e.g., a first beam) and the second report based at least in part on a second spatial stream (e.g., a second beam). The interference reporting configuration may indicate a respective priority for each report of the multi-part interference report, and the respective priority may be relative to other interference prediction reports and/or other transmissions that carry other information than an interference prediction report. In some aspects, the interference reporting configuration may specify to return an interference $R_{nn}$ matrix report, as described below.

As described above, the interference prediction configuration may include an interference reporting configuration that indicates an interference $R_{nn}$ matrix reporting configuration for returning an interference $R_{nn}$ matrix report. The interference $R_{nn}$ matrix reporting configuration may indicate to return the interference $R_{nn}$ matrix report as a singular report and/or as part of the multi-part interference report. Some examples of information included in an interference $R_{nn}$ matrix report may include, by way of example and not of limitation, any combination of a condition number associated with an interference $R_{nn}$ matrix, a singular value associated with the interference $R_{nn}$ matrix, an eigenvalue associated with the interference $R_{nn}$ matrix, and/or a diagonality state associated with the interference $R_{nn}$ matrix, as described below. Information returned in an interference $R_{nn}$ matrix report may enable the network node 110 to select an interference prediction configuration associated with the interference prediction(s) returned by the UE 120. That is, the interference $R_{nn}$ matrix information may enable the network node 110 to select an interference prediction mode and/or interference reporting configuration that balances reducing power consumption at the UE 120 with interference prediction metrics that may be used by the network node 110 to select a transmission configuration that mitigates the interference.

To illustrate, the network node 110 may indicate, via the interference matrix reporting configuration, to return a condition number in the interference $R_{nn}$ matrix report. For example, a condition number of the interference $R_{nn}$ matrix may be generated based at least in part on the formula:

$$\text{condition number} = \|R_{nn}\| \|R_{nn}^{-1}\| \quad (1)$$

where $\| \ \|$ represents the 2 norm of a matrix. In some aspects, a condition number that is within a threshold of a maximum value (e.g., "1") may indicate that diagonal elements of the associated interference $R_{nn}$ matrix have commensurate values (e.g., within a range and/or threshold of one another) and/or that the network node 110 may reconstruct the associated interference $R_{nn}$ matrix using trace prediction information. Accordingly, the network node 110 may indicate, in the interference reporting configuration, to return trace prediction information to reduce signaling overhead and/or to reduce power consumption at the UE 120. In some aspects, the network node 110 may indicate a trigger event (e.g., an interference reporting trigger event) that is associated with the condition number and/or a condition number threshold, such as a trigger event that indicates to report trace prediction information based at least in part on a condition number satisfying a maximum value threshold. Alternatively, or additionally, the network node 110 may indicate to use a trace prediction mode via an interference prediction configuration parameter. In some aspects, the network node 110 may instruct the UE 120 to transmit an interference $R_{nn}$ matrix report based at least in part on the condition number. As one example, the network node 110 may indicate a trigger event that instructs the UE 120 to transmit the interference $R_{nn}$ matrix report based at least in part on a variation in the condition number over a duration satisfying a change threshold.

Alternatively, or additionally, the network node 110 may indicate, via the interference matrix reporting configuration, to return eigenvalues of the interference $R_{nn}$ matrix, a condition number that is based at least in part on the eigenvalues, singular values of the interference $R_{nn}$ matrix (e.g., absolute values of the eigenvalues of a normal matrix), and/or a condition number that is based at least in part on the singular values. A condition number that is based at least in part on eigenvalues may be calculated, for normal matrices, based at least in part on using the formula:

$$\text{condition number} = \frac{\lambda_{max}(R_{nn})}{\lambda_{min}(R_{nn})} \quad (2)$$

where $\lambda_{max}(R_{nn})$ represents the maximum eigenvalue of $R_{nn}$ and $\lambda_{min}(R_{nn})$ represents the minimum eigenvalue of $R_{nn}$. A condition number that is based at least in part on singular values may be calculated based at least in part on using the formula:

$$\text{condition number} = \frac{\sigma_{max}(R_{nn})}{\sigma_{min}(R_{nn})} \quad (3)$$

where $\sigma_{max}(R_{nn})$ represents the maximum singular value of $R_{nn}$, and $\sigma_{min}(R_{nn})$ represents the minimum singular value of $R_{nn}$.

In some aspects, the network node 110 may indicate, via the interference matrix reporting configuration, to return a diagonality state of the interference $R_{nn}$ matrix. To illustrate, a diagonality state may include a first diagonality state that indicates that a matrix (e.g., the interference $R_{nn}$ matrix) is a full matrix, a second diagonality state that indicates that the matrix is a diagonal matrix, and/or a third diagonality state that indicates that the matrix is a diagonal matrix with commensurate diagonal elements. Accordingly, a diagonality state may indicate a scale and/or degree of diagonality of a matrix. In some aspects, the network node 110 may indicate a formula to use for evaluating a diagonality state of a matrix and/or may indicate to report a formula used to evaluate the diagonality state of a matrix. As one example, a ratio between a sum square (or absolute) of $R_{nn}$ diagonal elements to a sum square (or absolute) of off-diagonal elements of the $R_{nn}$ matrix as shown by the following formula:

$$\frac{\sum_i (R_{nn}[i,i])^2}{\alpha + \sum_{i \neq j}(R_{nn}[i,j])^2} \quad (4)$$

where i is a first integer, j is a second integer, and $\alpha$ is a constant having a small value to avoid dividing by a zero when $\Sigma_{i \neq j}(R_{nn}[i,j])^2$ approaches zero, may provide an indication of whether the Ram matrix is a full matrix or a diagonal matrix.

Alternatively, or additionally, the network node 110 may indicate, via the interference matrix reporting configuration, to report one or more statistical properties associated with the diagonality state, such as a mean, a variance, a histogram, and/or a distribution of a diagonality indicator (e.g., a diagonality state, a condition number, a singular value, and/or an eigenvalue) over a duration. In some aspects, an interference power metric, a correlation metric, and/or a rank may vary for different parameters. To illustrate, the interference, correlation, and rank may vary between a first receive beam and a second receive beam, a first band and a second band, a first sub-band and a second sub-band, a first time partition (e.g., a slot, a frame, a sub-slot) and a second time partition, and/or a first duration and a second duration. Accordingly, the network node 110 may indicate one or more parameters for generating the statistical property. For example, the network node 110 may indicate to generate the statistical property based at least in part on any combination of a particular receive beam, a particular band, a particular sub-band, a particular time partition (e.g., a slot, a frame, a sub-slot), and/or a particular duration. By configuring the UE 120 to generate a statistical property based at least in part on a particular parameter, the network node 110 may receive information that enables the network node 110 to modify a transmission configuration for a transmission that is based at least in part on the particular parameter and mitigate interference.

In some aspects, variations in $R_{nn}$ correlation may be negligible (e.g., satisfy a negligible threshold) over a duration and/or may not introduce enough difference to cause the network node 110 to change a transmission configuration. Accordingly, to preserve air interface resources and/or to reduce power consumption at the UE 120, the network node 110 may indicate to report one or more statistical properties associated with the diagonality state over multiple resources (e.g., instead of reporting a respective diagonality state for each resource used to generate the diagonality state).

In some aspects, the network node 110 may indicate an uplink grant associated with transmitting an interference $R_{nn}$ matrix report and/or an interference prediction report, such as a periodic semi-persistent grant and/or an aperiodic grant. As one example, the network node 110 may indicate a configuration of the uplink grant as at least part of the interference prediction configuration and/or as at least part of the interference reporting configuration. As another example, the network node 110 may indicate the configuration of the uplink grant separately from the interference prediction configuration in any combination of Layer 1 signaling (e.g., downlink control information (DCI)), Layer 2 signaling, and/or Layer 3 signaling.

To illustrate, the network node 110 may assign a configured grant and/or semi-persistent scheduling (SPS) to the UE 120. In some aspects, the network node 110 may select a periodicity of the SPS based at least in part on a variation in the $R_{nn}$ correlation. To illustrate, the network node 110 may select a first periodicity for a first variation (e.g., in a condition number and/or a singular value as described above) and a second periodicity that is shorter than the first periodicity for a second variation that is larger and/or changes more relative to the first variation. Alternatively, or additionally, the network node 110 may assign an aperiodic uplink resource to the UE 120 for updates to the interference $R_{nn}$ matrix report, such as an update to a condition number. In some aspects, the network node 110 may instruct the UE 120 to report the interference $R_{nn}$ matrix report less frequently than an interference prediction report. The network node 110 may indicate, via the interference matrix reporting configuration and/or separately from the interference matrix reporting configuration, to transmit the interference $R_{nn}$ matrix report in a physical uplink control channel (PUCCH) resource and/or a PUSCH resource. As one example, and in a similar manner as described above, the network node 110 may instruct the UE 120 to multiplex the interference $R_{nn}$ matrix report with another uplink transmission.

The interference matrix reporting configuration may specify a trigger event associated with transmitting an interference $R_{nn}$ matrix report, such as a trigger event associated with a trace value (e.g., a trace of the interference $R_{nn}$ matrix) satisfying a first threshold and/or a diagonality state satisfying a second threshold. Specifying a trigger event may enable the network node 110 to configure the UE 120 to report changes to the interference $R_{nn}$ matrix that satisfy a change threshold. That is, the network node 110 may configure the UE 120 to refrain from reporting changes to the interference $R_{nn}$ matrix until detecting that the changes satisfy a change threshold and consequently preserve air interface resources for other purposes. Alternatively, or additionally, the interference reporting configuration may indicate a priority associated with transmitting the interference $R_{nn}$ matrix report.

Alternatively, or additionally, the network node 110 may indicate, via the interference matrix reporting configuration, to multiplex the interference $R_{nn}$ matrix report with one or more other uplink transmissions. To illustrate, based at least in part on a time division duplex (TDD) configuration, a number of uplink slots and/or uplink symbols associated with transmitting an entirety of the interference $R_{nn}$ matrix report (e.g., with other uplink transmissions) may be insufficient for a particular time span. Accordingly, the network node 110 may specify to multiplex the interference $R_{nn}$ matrix report with a scheduled uplink transmission, such as an interference prediction report, a channel state feedback report, a PUSCH resource, and/or a hybrid automatic repeat request (HARQ) acknowledgement resource. In some aspects, a prioritization assigned to an interference $R_{nn}$ matrix report may enable the UE 120 to resolve conflicts between transmitting the interference $R_{nn}$ matrix report and other uplink messages (e.g., CSI reporting, a HARQ acknowledgement report, and/or a scheduling request (SR)). To illustrate, a priority may enable the UE 120 to determine whether to multiplex the interference $R_{nn}$ matrix report with another uplink transmission and/or to refrain from transmitting the interference $R_{nn}$ matrix report.

The network node 110 may indicate an ordering of the multiplexing (e.g., before or after channel coding). The ordering may be implicit, and/or may be specified by a communication standard. Multiplexing after channel coding may simplify the multiplexing process relative to multiplexing before channel coding, while multiplexing before channel coding may use available resources more efficiently. In some aspects, the network node 110 may indicate to multiplex trigger-event-based interference reports (e.g., an interference prediction report and/or an interference $R_{nn}$ matrix report) with the other uplink transmissions.

In some aspects, the priority assigned to an interference $R_{nn}$ matrix report may be conditional and/or based at least in part on a duration associated with transmitting a prior interference $R_{nn}$ matrix report that was transmitted (e.g., the last interference $R_{nn}$ matrix report transmitted by the UE). For example, a first duration of 50 milliseconds (msec) may prioritize transmission of a first interference $R_{nn}$ matrix report lower than a second duration of 200 msec associated with a second interference $R_{nn}$ matrix report based at least in part on a first interference $R_{nn}$ matrix report associated with the shorter duration potentially being valid (e.g., less variation over the shorter duration) and/or the second interference $R_{nn}$ matrix report potentially being outdated.

The network node 110 may configure, via the interference matrix reporting configuration, a type of information returned by the UE 120 in an interference $R_{nn}$ matrix report. To illustrate, the network node 110 may indicate to transmit differential interference $R_{nn}$ matrix information and/or absolute interference $R_{nn}$ matrix information. In some aspects, the differential interference $R_{nn}$ information may be based at least in part on changes to the interference $R_{nn}$ matrix from a prior full interference $R_{nn}$ matrix report, and absolute interference $R_{nn}$ matrix information may be $R_{nn}$ information that is independent and/or not relative to the prior full interference $R_{nn}$ matrix report. To illustrate, the network node 110 may configure the UE 120 (e.g., via a trigger event and/or a reporting configuration parameter) to report absolute interference $R_{nn}$ matrix information based at least in part on determining that a variation in a statistical property over a duration satisfies a large change threshold, and/or to report differential interference $R_{nn}$ matrix information based at least in part on determining that the variation fails to satisfy the large change threshold. In some aspects, the network node 110 may modify a periodicity duration between transmitting interference $R_{nn}$ matrix information based at least in part on the variation (e.g., a shorter periodicity duration for larger variation relative to smaller variation).

Alternatively, or additionally, the interference matrix reporting configuration may indicate one or more MCSs for the UE 120 to use in transmitting an interference $R_{nn}$ matrix report, such as a first MCS for transmitting differential interference $R_{nn}$ information and a second MCS for transmitting an absolute interference $R_{nn}$ information. In some aspects, the first MCS associated with the differential interference $R_{nn}$ information may be lower relative to a second MCS that is associated with transmitting absolute interference $R_{nn}$ information. As another example, the network node 110 may configure, by way of the interference matrix reporting configuration, the UE 120 to report a variation associated with a diagonality state of the interference $R_{nn}$ matrix as described above to reduce reporting overhead. In some aspects, the network node 110 may indicate to use a lower MCS for a first interference $R_{nn}$ matrix report that includes less information relative to a second interference $R_{nn}$ matrix report that includes more information. Accordingly, a higher MCS may be used for interference reports that include more information to improve spectral efficiency.

As shown by reference number 540, the UE 120 may calculate one or more interference prediction(s) based at least in part on the interference prediction configuration. Alternatively, or additionally, the UE 120 may generate an interference $R_{nn}$ matrix report. In some aspects, the UE 120 may calculate the interference prediction(s) and/or the interference $R_{nn}$ matrix report based at least in part on detecting a trigger event and/or based at least in part on a periodicity. For instance, the UE 120 may iteratively calculate a full interference $R_{nn}$ matrix and/or iteratively evaluate the full interference $R_{nn}$ matrix. The UE 120 may evaluate the full interference $R_{nn}$ matrix based at least in part on a first trigger event associated with a trace value of the full interference $R_{nn}$ matrix satisfying a first threshold and/or a second trigger event associated with a diagonality state of the full interference $R_{nn}$ matrix satisfying a second threshold.

The UE 120 may calculate a full interference $R_{nn}$ matrix (e.g., calculate all elements of the matrix) based at least in part on any combination of factors and/or parameters, such as a load size currently supported by a network node, resource utilization by the network node, a number of active UEs within a cell area, a number of beams, a number of TCI states actively being used within the cell area, and/or a respective elevation and/or a respective azimuth angle of a respective beam. The UE 120 may calculate one or more predicted interference power metrics, a trace prediction value, and/or diagonal elements of an interference $R_{nn}$ matrix. In some aspects, the UE 120 may calculate the interference prediction(s) based at least in part on a periodicity.

Alternatively, or additionally, the UE 120 may calculate one or more metrics that are included in an interference $R_{nn}$ matrix report. To illustrate, the UE 120 may calculate any combination of a condition number, a correlation metric, an eigenvalue, a singular value, a diagonality state, and/or a statistical property associated with the diagonality state.

As shown by reference number 550, the UE 120 may transmit, and the network node 110 may receive, one or more interference prediction reports and/or one or more interference $R_{nn}$ matrix reports. An interference prediction report may include any combination of interference prediction information, such as, by way of example and not of limitation, a predicted interference power metric, a full interference $R_{nn}$ matrix, diagonal elements of the interference $R_{nn}$ matrix, and/or trace information of the interference $R_{nn}$ matrix, and/or an interference $R_{nn}$ matrix report. As described above, an interference $R_{nn}$ matrix report may indicate any combination of a condition number, a correlation metric, an eigenvalue, a diagonality state, and/or a statistical property associated with the diagonality state.

In some aspects, the UE 120 may transmit the interference prediction report and/or the interference $R_{nn}$ matrix report based at least in part on detecting a trigger event, as described above. Alternatively, or additionally, the UE 120 may transmit the interference prediction report based at least in part on a periodicity and/or an uplink grant. The UE 120 may transmit the interference prediction report and/or the interference $R_{nn}$ matrix report as a multi-part interference report, as described above, and each part and/or each report of the multi-part interference report may be associated with a respective priority and/or a respective periodicity. For example, the UE 120 may transmit a first part and/or first report of the multi-part report (e.g., a predicted interference power metric report) based at least in part on a first reporting period and/or a first priority, and a second part and/or second report of the multi-part report based at least in part on a second reporting period and/or a second priority. The UE 120 may multiplex a trigger event-based interference report (e.g., an interference $R_{nn}$ matrix report and/or an interference prediction report) with another uplink transmission, such as by multiplexing an interference $R_{nn}$ matrix report with another scheduled interference prediction report (e.g., that includes a predicted interference power metric), a channel state feedback report, a PUSCH resource, and/or a HARQ acknowledgement resource. The UE 120 may transmit different interference reports based at least in part on different MCSs. Alternatively, or additionally, the UE may transmit one or more interference reports using any combination of Layer 1 signaling (e.g., UCI), Layer 2 signaling (e.g., a MAC CE), and/or Layer 3 signaling (e.g., RRC signaling).

As shown by reference number 560, the network node 110 may select a transmission configuration. In some aspects, the network node 110 may select a transmission configuration that mitigates predicted interference. To illustrate, the network node 110 may select a resource, an MCS, and/or rank for a transmission configuration that is associated with an uplink transmission from and/or downlink transmission to the UE 120 based at least in part on mitigating predicted interference. As another example, the network node 110 may modify a transmission configuration that is associated with a reference signal to mitigate interference with the reference signal.

As shown by reference number 570, the network node 110 may transmit, and the UE 120 may receive, an indication of the transmission configuration. The network node 110 may transmit the indication of the transmission configuration in a combination of Layer 1 signaling (e.g., DCI), Layer 2 signaling (e.g., a MAC CE), and/or Layer 3 signaling (e.g., RRC signaling).

As shown by reference number 580, the network node 110 and the UE 120 may communicate with one another based at least in part on the transmission configuration. To illustrate, the network node 110 may transmit a downlink communication based at least in part on the transmission configuration. Alternatively, or additionally, the UE 120 may transmit an uplink communication based at least in part on the transmission configuration.

As shown by reference number 590, the network node 110 and/or the UE 120 may iteratively update an interference prediction configuration and/or transmission configuration. For example, the UE 120 may select an updated UE-selected interference prediction mode, as described with regard to reference number 520. Alternatively, or additionally, the network node 110 may select and/or indicate an updated interference prediction configuration and/or updated interference prediction reporting configuration, as described with regard to reference number 530. To illustrate, the network node 110 may instruct the UE 120 to switch from using a first interference prediction mode to using a second interference prediction mode, switch from using a first interference prediction reporting mode to using a second interference prediction reporting mode, and/or switch from reporting a first type of interference prediction information to reporting a second type of interference prediction information.

In some aspects, the UE 120 may calculate an updated interference prediction as described with regard to reference number 540 and/or transmit an updated interference prediction report as described with regard to reference number 550. The network node 110 may select an updated transmission configuration as described with regard to reference number 560 and/or may transmit an indication of the updated transmission configuration as described with regard to reference number 570. Alternatively, or additionally, the network node 110 and the UE 120 may communicate with one another based at least in part on the updated transmission configuration as described with regard to reference number 580.

The ability to adapt an interference prediction mode, such as an interference prediction mode used by a UE to predict interference, may enable a network node to modify a type of interference prediction information returned by the UE. In some aspects, the network node may select a first interference prediction mode that increases an amount of prediction information returned by the UE and enables the network node to select a transmission configuration and/or resources that mitigate interference. In other aspects, the network node may select a different interference prediction mode (e.g., the second interference prediction mode and/or the third interference prediction mode as described above) that reduces power consumption at the UE to preserve a battery life at the UE. Accordingly, the ability to modify an interference prediction mode may result in an increased operating life span of a UE, reduced recovery errors, increased data throughput, and/or decreased data transfer latencies.

As indicated above, FIG. 5 is provided as an example. Other examples may differ from what is described with regard to FIG. 5.

Figure 6:
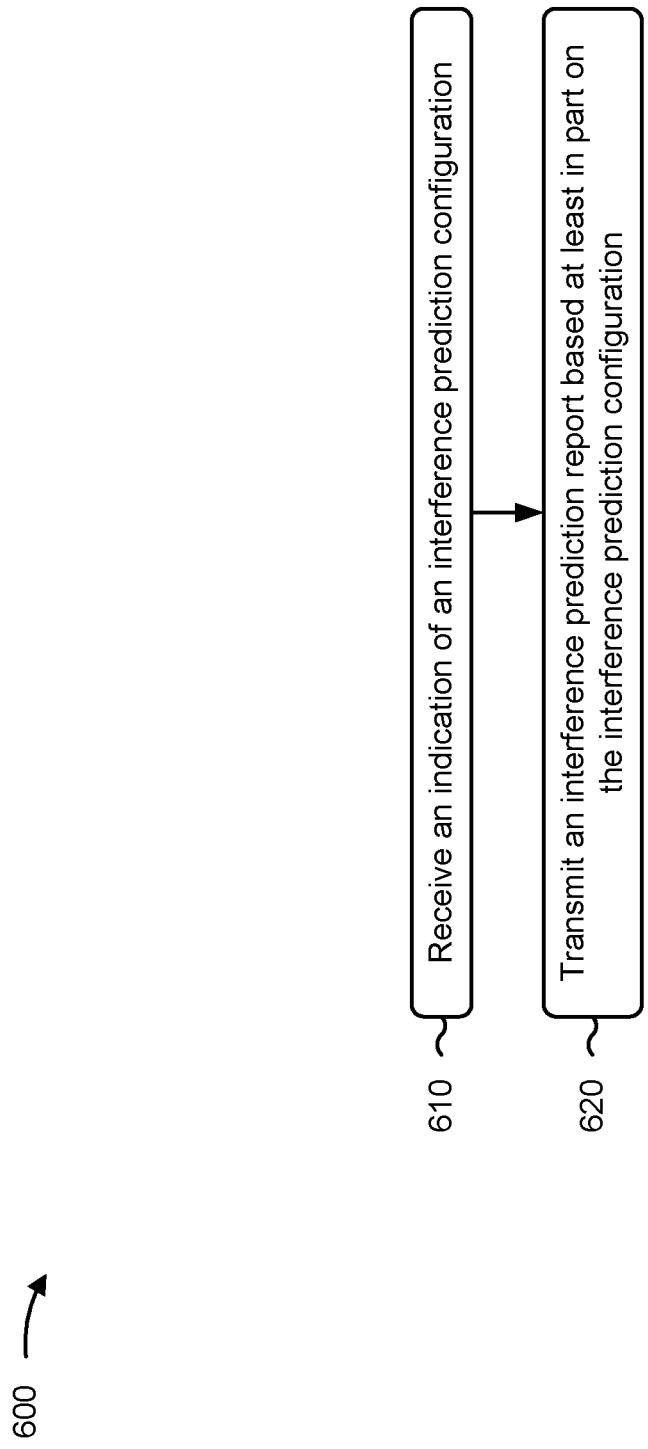
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with configuring interference prediction modes.

As shown in FIG. 6, in some aspects, process 600 may include receiving an indication of an interference prediction configuration (block 610). For example, the UE (e.g., using reception component 802 and/or communication manager 806, depicted in FIG. 8) may receive an indication of an interference prediction configuration, as described above.

As further shown in FIG. 6, in some aspects, process 600 may include transmitting an interference prediction report based at least in part on the interference prediction configuration (block 620). For example, the UE (e.g., using transmission component 804 and/or communication manager 806, depicted in FIG. 8) may transmit an interference prediction report based at least in part on the interference prediction configuration, as described above.

Process 600 may include additional aspects, such as any single aspect or any combination of aspects described below and/or in connection with one or more other processes described elsewhere herein.

In a first aspect, the interference prediction configuration indicates selection of a prediction mode.

In a second aspect, the prediction mode includes at least one of a trace of the interference autocorrelation matrix prediction mode, a diagonal interference autocorrelation matrix prediction mode, or a full interference autocorrelation matrix prediction mode.

In a third aspect, the interference prediction configuration indicates a switching threshold that is associated with switching from a first prediction mode to a second prediction mode.

In a fourth aspect, the interference prediction configuration includes an interference reporting configuration.

In a fifth aspect, the interference reporting configuration indicates a reporting period that is associated with reporting a predicted interference power metric, and process 600 includes reporting the predicted interference power metric based at least in part on the reporting period.

In a sixth aspect, the reporting period is a first reporting period, the interference reporting configuration indicates a second reporting period that is associated with reporting a predicted interference correlation metric, and process 600 includes reporting the predicted interference correlation metric based at least in part on the second reporting period.

In a seventh aspect, the interference reporting configuration indicates to return a multi-part interference report.

In an eighth aspect, the multi-part interference report includes a first report that is associated with one or more predicted interference power metrics, and a second report that is associated with one or more predicted correlation metrics associated with interference.

In a ninth aspect, the interference reporting configuration indicates a respective priority for each report of the multi-part interference report.

In a tenth aspect, the indication is a first indication, and process 600 includes transmitting a second indication of a UE-selected prediction mode, and the interference prediction configuration indicates the UE-selected prediction mode.

In an eleventh aspect, process 600 includes transmitting UE-capability information that indicates one or more UE-supported interference prediction capabilities, and the interference prediction configuration is based at least in part on the one or more UE-supported interference prediction capabilities.

In a twelfth aspect, the one or more UE-supported interference predication capabilities include one or more UE-supported prediction modes.

In a thirteenth aspect, the interference prediction configuration indicates an interference reporting configuration, and the interference reporting configuration indicates to return an interference $R_{nn}$ matrix report.

In a fourteenth aspect, the interference $R_{nn}$ matrix report includes at least one of a condition number associated with an interference autocorrelation matrix, a singular value associated with the interference autocorrelation matrix, an eigenvalue associated with the interference autocorrelation matrix, or a diagonality state associated with the interference autocorrelation matrix.

In a fifteenth aspect, the interference $R_{nn}$ matrix report includes the diagonality state, and the diagonality state is based at least in part on a formula that evaluates the interference autocorrelation matrix.

In a sixteenth aspect, process 600 includes receiving an uplink grant associated with transmitting at least one of the interference $R_{nn}$ matrix report, or the interference prediction report.

In a seventeenth aspect, the uplink grant includes at least one of a periodic semi-persistent grant, or an aperiodic grant.

In an eighteenth aspect, the interference reporting configuration indicates a trigger event associated with transmitting the interference $R_{nn}$ matrix report.

In a nineteenth aspect, the interference reporting configuration indicates a priority associated with transmitting the interference $R_{nn}$ matrix report.

In a twentieth aspect, the interference reporting configuration indicates to multiplex the interference $R_{nn}$ matrix report with a scheduled uplink transmission.

In a twenty-first aspect, the scheduled uplink transmission includes at least one of the interference prediction report, a channel state feedback report, a physical uplink shared channel resource, or a hybrid automatic repeat request acknowledgement resource.

In a twenty-second aspect, the interference reporting configuration indicates to transmit the interference $R_{nn}$ matrix report based at least in part on differential autocorrelation matrix information.

In a twenty-third aspect, the interference reporting configuration indicates a first MCS for transmitting the interference $R_{nn}$ matrix report, and the first MCS is lower relative to a second MCS that is associated with transmitting absolute autocorrelation matrix information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
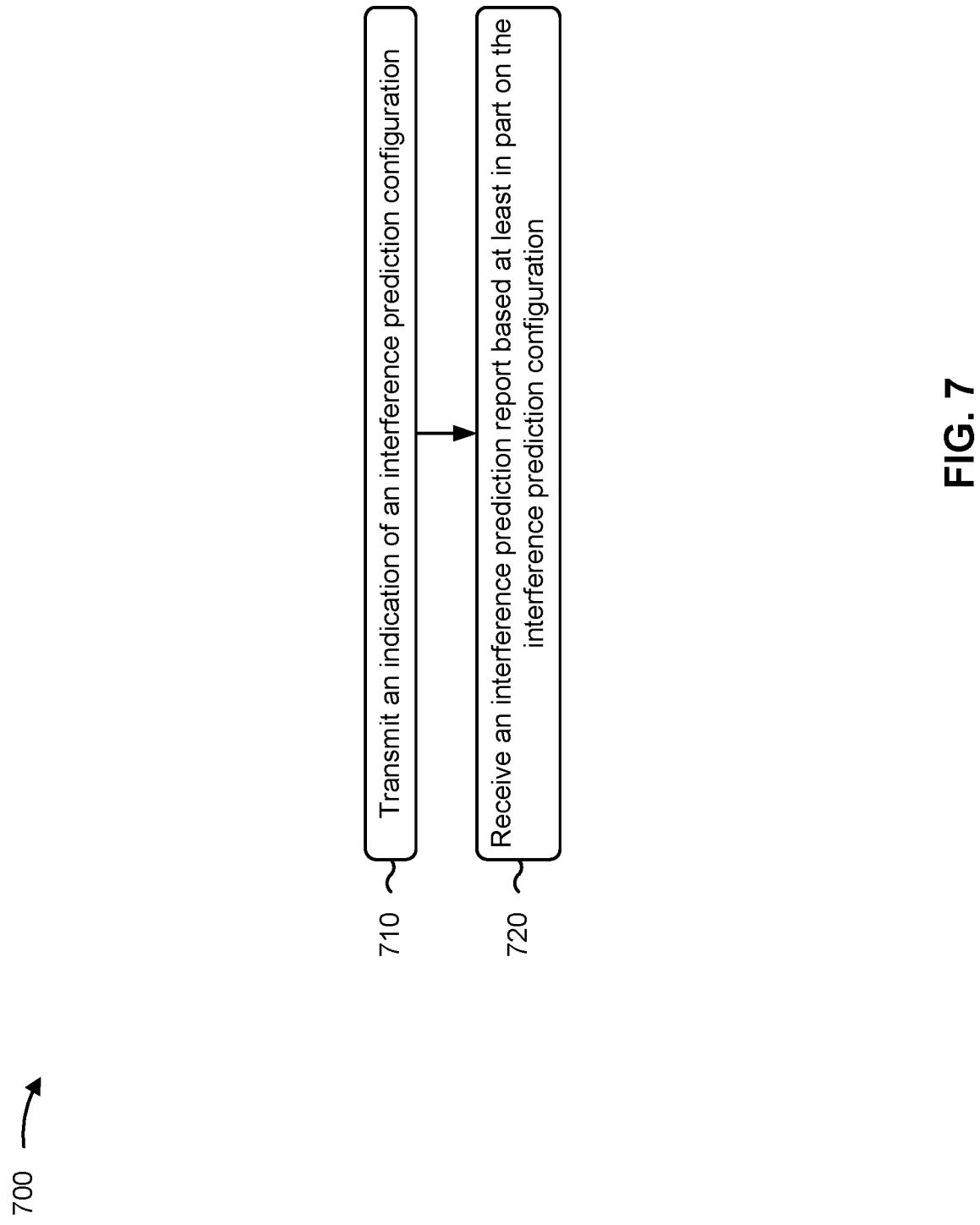
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with configuring interference prediction modes.

As shown in FIG. 7, in some aspects, process 700 may include transmitting an indication of an interference prediction configuration (block 710). For example, the network node (e.g., using transmission component 904 and/or communication manager 906, depicted in FIG. 9) may transmit an indication of an interference prediction configuration, as described above.

As further shown in FIG. 7, in some aspects, process 700 may include receiving an interference prediction report based at least in part on the interference prediction configuration (block 720). For example, the network node (e.g., using reception component 902 and/or communication manager 906, depicted in FIG. 9) may receive an interference prediction report based at least in part on the interference prediction configuration, as described above.

Process 700 may include additional aspects, such as any single aspect or any combination of aspects described below and/or in connection with one or more other processes described elsewhere herein.

In a first aspect, the interference prediction configuration indicates selection of a prediction mode.

In a second aspect, the prediction mode includes at least one of a trace prediction mode, a diagonal interference autocorrelation matrix prediction mode, or a full interference autocorrelation matrix prediction mode.

In a third aspect, the interference prediction configuration indicates a switching threshold that is associated with switching from a first prediction mode to a second prediction mode.

In a fourth aspect, the interference prediction configuration includes an interference reporting configuration.

In a fifth aspect, the interference reporting configuration indicates a reporting period that is associated with reporting a predicted interference power metric.

In a sixth aspect, the reporting period is a first reporting period, and the interference reporting configuration indicates a second reporting period that is associated with reporting a predicted interference correlation metric.

In a seventh aspect, the interference reporting configuration indicates to return a multi-part interference report.

In an eighth aspect, the multi-part interference report includes a first report that is associated with one or more predicted interference power metrics, and a second report that is associated with one or more predicted correlation metrics associated with interference.

In a ninth aspect, the interference reporting configuration indicates a respective priority for each report of the multi-part interference report.

In a tenth aspect, the indication is a first indication, and process 700 includes receiving a second indication of a UE-selected prediction mode, and the interference prediction configuration is based at least in part on the UE-selected prediction mode.

In an eleventh aspect, process 700 includes receiving UE-capability information that indicates one or more UE-supported interference prediction capabilities, and the interference prediction configuration is based at least in part on the one or more UE-supported interference prediction capabilities.

In a twelfth aspect, the one or more UE-supported interference predication capabilities include one or more UE-supported prediction modes.

In a thirteenth aspect, the interference prediction configuration indicates an interference reporting configuration, and the interference reporting configuration indicates to return an interference $R_{nn}$ matrix report.

In a fourteenth aspect, the interference $R_{nn}$ matrix report includes at least one of a condition number associated with an interference autocorrelation matrix, a singular value associated with the interference autocorrelation matrix, an eigenvalue associated with the interference autocorrelation matrix, or a diagonality state associated with the interference autocorrelation matrix.

In a fifteenth aspect, the interference $R_{nn}$ matrix report includes the diagonality state, and the diagonality state is based at least in part on a formula that evaluates the interference autocorrelation matrix.

In a sixteenth aspect, process 700 includes transmitting an uplink grant associated with transmitting at least one of the interference $R_{nn}$ matrix report, or the interference prediction report.

In a seventeenth aspect, the uplink grant includes at least one of a periodic semi-persistent grant, or an aperiodic grant.

In an eighteenth aspect, the interference reporting configuration indicates a trigger event associated with transmitting the interference $R_{nn}$ matrix report.

In a nineteenth aspect, the interference reporting configuration indicates a priority associated with transmitting the interference $R_{nn}$ matrix report.

In a twentieth aspect, the interference reporting configuration indicates to multiplex the interference $R_{nn}$ matrix report with a scheduled uplink transmission.

In a twenty-first aspect, the scheduled uplink transmission includes at least one of the interference prediction report, a channel state feedback report, a physical uplink shared channel resource, or a hybrid automatic repeat request acknowledgement resource.

In a twenty-second aspect, the interference reporting configuration indicates to transmit the interference $R_{nn}$ matrix report based at least in part on differential autocorrelation matrix information.

In a twenty-third aspect, the interference reporting configuration indicates a first MCS for transmitting the interference $R_{nn}$ matrix report, and the first MCS is lower relative to a second MCS that is associated with transmitting absolute autocorrelation matrix information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
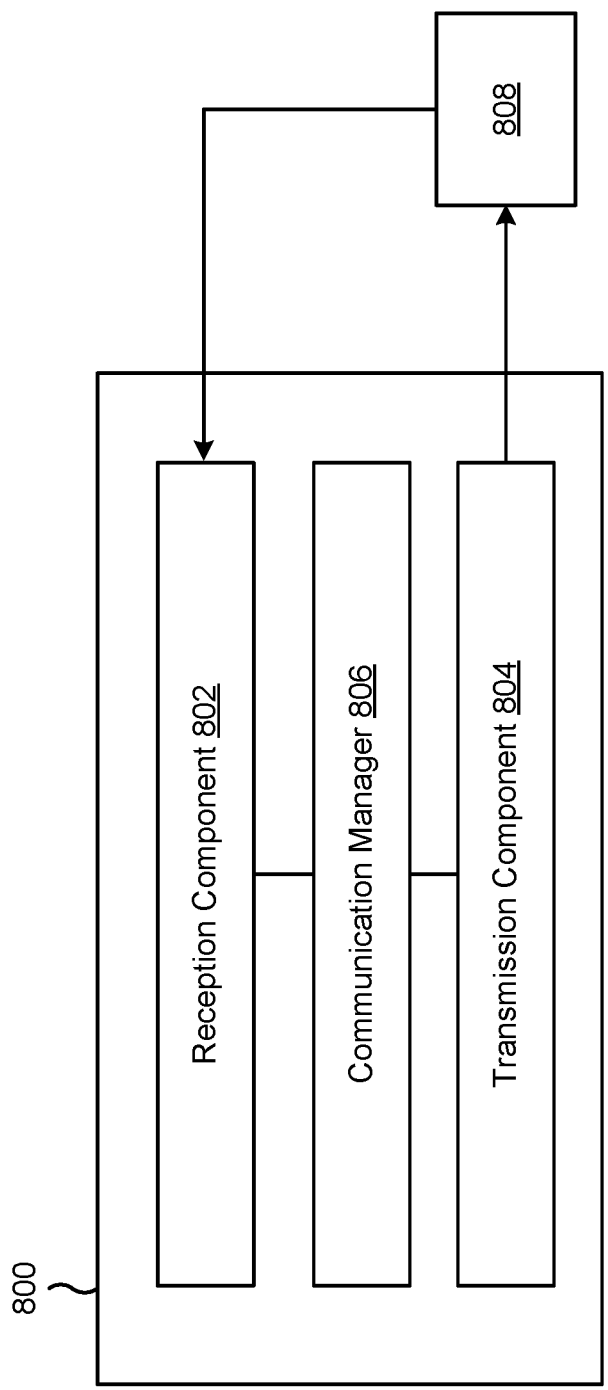
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 4A-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, one or more memories, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The communication manager 806 may receive, by way of the reception component 802, an indication of an interference prediction configuration. The communication manager 806 may transmit, by way of the transmission component 804, an interference prediction report based at least in part on the interference prediction configuration.

The communication manager 806 may transmit, by way of the transmission component 804, UE-capability information that indicates one or more UE-supported interference prediction capabilities, and the interference prediction configuration is based at least in part on the one or more UE-supported interference prediction capabilities.

The communication manager 806 may receive, by way of the reception component 802, an uplink grant associated with transmitting at least one of the interference $R_{nn}$ matrix report, or the interference prediction report.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
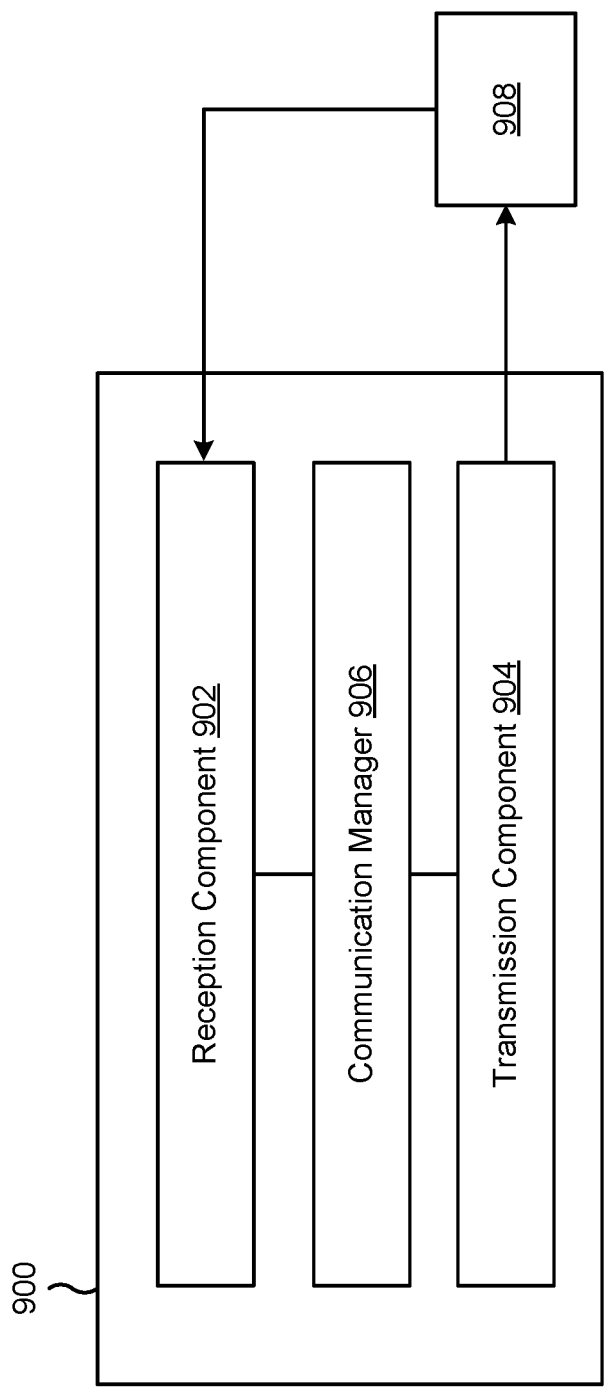
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4A-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, one or more memories, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, one or more memories, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may transmit, by way of the transmission component 904, an indication of an interference prediction configuration. The communication manager 906 may receive, by way of the reception component 902, an interference prediction report based at least in part on the interference prediction configuration.

The communication manager 906 may receive, by way of the reception component 902, UE-capability information that indicates one or more UE-supported interference prediction capabilities, and the interference prediction configuration is based at least in part on the one or more UE-supported interference prediction capabilities.

The communication manager 906 may transmit, by way of the transmission component 904, an uplink grant associated with transmitting at least one of the interference $R_{nn}$ matrix report, or the interference prediction report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving an indication of an interference prediction configuration; and transmitting an interference prediction report based at least in part on the interference prediction configuration.

Aspect 2: The method of Aspect 1, wherein the interference prediction configuration indicates selection of a prediction mode.

Aspect 3: The method of Aspect 2, wherein the prediction mode comprises at least one of: a trace of the interference autocorrelation matrix prediction mode, a diagonal interference autocorrelation matrix prediction mode, or a full interference autocorrelation matrix prediction mode.

Aspect 4: The method of Aspect 2 or Aspect 3, wherein the interference prediction configuration indicates a switching threshold that is associated with switching from a first prediction mode to a second prediction mode.

Aspect 5: The method of any of Aspects 1-4, wherein the interference prediction configuration comprises an interference reporting configuration.

Aspect 6: The method of Aspect 5, wherein the interference reporting configuration indicates a reporting period that is associated with reporting a predicted interference power metric, and the method further comprises: reporting the predicted interference power metric based at least in part on the reporting period.

Aspect 7: The method of Aspect 6, wherein the reporting period is a first reporting period, wherein the interference reporting configuration indicates a second reporting period that is associated with reporting a predicted interference correlation metric, and the method further comprises: reporting the predicted interference correlation metric based at least in part on the second reporting period.

Aspect 8: The method of any of Aspects 5-7, wherein the interference reporting configuration indicates to return a multi-part interference report.

Aspect 9: The method of Aspect 8, wherein the multi-part interference report comprises: a first report that is associated with one or more predicted interference power metrics, and a second report that is associated with one or more predicted correlation metrics associated with interference.

Aspect 10: The method of Aspect 8 or Aspect 9, wherein the interference reporting configuration indicates a respective priority for each report of the multi-part interference report.

Aspect 11: The method of any of Aspects 1-10, wherein the indication is a first indication, and the method further comprises: transmitting a second indication of a UE-selected prediction mode, wherein the interference prediction configuration indicates the UE-selected prediction mode.

Aspect 12: The method of any of Aspects 1-11, further comprising: transmitting UE-capability information that indicates one or more UE-supported interference prediction capabilities, wherein the interference prediction configuration is based at least in part on the one or more UE-supported interference prediction capabilities.

Aspect 13: The method of Aspect 12, wherein the one or more UE-supported interference predication capabilities comprise one or more UE-supported prediction modes.

Aspect 14: The method of any of Aspects 1-13, wherein the interference prediction configuration indicates an interference reporting configuration, and wherein the interference reporting configuration indicates to return an interference autocorrelation matrix report.

Aspect 15: The method of Aspect 14, wherein the interference autocorrelation matrix report comprises at least one of: a condition number associated with an interference autocorrelation matrix, a singular value associated with the interference autocorrelation matrix, an eigenvalue associated with the interference autocorrelation matrix, or a diagonality state associated with the interference autocorrelation matrix.

Aspect 16: The method of Aspect 15, wherein the interference autocorrelation matrix report comprises the diagonality state, and wherein the diagonality state is based at least in part on a formula that evaluates the interference autocorrelation matrix.

Aspect 17: The method of any of Aspects 14-16, further comprising: receiving an uplink grant associated with transmitting at least one of: the interference autocorrelation matrix report, or the interference prediction report.

Aspect 18: The method of Aspect 17, wherein the uplink grant comprises at least one of: a periodic semi-persistent grant, or an aperiodic grant.

Aspect 19: The method of any of Aspects 14-18, wherein the interference reporting configuration indicates a trigger event associated with transmitting the interference autocorrelation matrix report.

Aspect 20: The method of any of Aspects 14-19, wherein the interference reporting configuration indicates a priority associated with transmitting the interference autocorrelation matrix report.

Aspect 21: The method of any of Aspects 14-20, wherein the interference reporting configuration indicates to multiplex the interference autocorrelation matrix report with a scheduled uplink transmission.

Aspect 22: The method of Aspect 21, wherein the scheduled uplink transmission comprises at least one of: the interference prediction report, a channel state feedback report, a physical uplink shared channel resource, or a hybrid automatic repeat request acknowledgement resource.

Aspect 23: The method of any of Aspects 14-22, wherein the interference reporting configuration indicates to transmit the interference autocorrelation matrix report based at least in part on differential autocorrelation matrix information.

Aspect 24: The method of Aspect 23, wherein the interference reporting configuration indicates a first modulation and coding scheme (MCS) for transmitting the interference autocorrelation matrix report, and wherein the first MCS is lower relative to a second MCS that is associated with transmitting absolute autocorrelation matrix information.

Aspect 25: A method of wireless communication performed by a network node, comprising: transmitting an indication of an interference prediction configuration; and receiving an interference prediction report based at least in part on the interference prediction configuration.

Aspect 26: The method of Aspect 25, wherein the interference prediction configuration indicates selection of a prediction mode.

Aspect 27: The method of Aspect 26, wherein the prediction mode comprises at least one of: a trace prediction mode, a diagonal interference autocorrelation matrix prediction mode, or a full interference autocorrelation matrix prediction mode.

Aspect 28: The method of any of Aspects 25-27, wherein the interference prediction configuration indicates a switching threshold that is associated with switching from a first prediction mode to a second prediction mode.

Aspect 29: The method of any of Aspects 25-28, wherein the interference prediction configuration comprises an interference reporting configuration.

Aspect 30: The method of Aspect 29, wherein the interference reporting configuration indicates a reporting period that is associated with reporting a predicted interference power metric.

Aspect 31: The method of Aspect 30, wherein the reporting period is a first reporting period, and wherein the interference reporting configuration indicates a second reporting period that is associated with reporting a predicted interference correlation metric.

Aspect 32: The method of Aspect 29, wherein the interference reporting configuration indicates to return a multi-part interference report.

Aspect 33: The method of Aspect 32, wherein the multi-part interference report comprises: a first report that is associated with one or more predicted interference power metrics, and a second report that is associated with one or more predicted correlation metrics associated with interference.

Aspect 34: The method of Aspect 32, wherein the interference reporting configuration indicates a respective priority for each report of the multi-part interference report.

Aspect 35: The method of any of Aspects 25-34, wherein the indication is a first indication, and the method further comprises: receiving a second indication of a UE-selected prediction mode, wherein the interference prediction configuration is based at least in part on the UE-selected prediction mode.

Aspect 36: The method of any of Aspects 25-35, further comprising: receiving UE-capability information that indicates one or more UE-supported interference prediction capabilities, wherein the interference prediction configuration is based at least in part on the one or more UE-supported interference prediction capabilities.

Aspect 37: The method of Aspect 36, wherein the one or more UE-supported interference predication capabilities comprise one or more UE-supported prediction modes.

Aspect 38: The method of any of Aspects 25-37, wherein the interference prediction configuration indicates an interference reporting configuration, and wherein the interference reporting configuration indicates to return an interference autocorrelation matrix report.

Aspect 39: The method of Aspect 38, wherein the interference autocorrelation matrix report comprises at least one of: a condition number associated with an interference autocorrelation matrix, a singular value associated with the interference autocorrelation matrix, an eigenvalue associated with the interference autocorrelation matrix, or a diagonality state associated with the interference autocorrelation matrix.

Aspect 40: The method of Aspect 39, wherein the interference autocorrelation matrix report comprises the diagonality state, and wherein the diagonality state is based at least in part on a formula that evaluates the interference autocorrelation matrix.

Aspect 41: The method of Aspect 38, further comprising: transmitting an uplink grant associated with transmitting at least one of: the interference autocorrelation matrix report, or the interference prediction report.

Aspect 42: The method of Aspect 41, wherein the uplink grant comprises at least one of: a periodic semi-persistent grant, or an aperiodic grant.

Aspect 43: The method of Aspect 38, wherein the interference reporting configuration indicates a trigger event associated with transmitting the interference autocorrelation matrix report.

Aspect 44: The method of Aspect 38, wherein the interference reporting configuration indicates a priority associated with transmitting the interference autocorrelation matrix report.

Aspect 45: The method of Aspect 38, wherein the interference reporting configuration indicates to multiplex the interference autocorrelation matrix report with a scheduled uplink transmission.

Aspect 46: The method of Aspect 45, wherein the scheduled uplink transmission comprises at least one of: the interference prediction report, a channel state feedback report, a physical uplink shared channel resource, or a hybrid automatic repeat request acknowledgement resource.

Aspect 47: The method of Aspect 38, wherein the interference reporting configuration indicates to transmit the interference autocorrelation matrix report based at least in part on differential autocorrelation matrix information.

Aspect 48: The method of Aspect 47, wherein the interference reporting configuration indicates a first modulation and coding scheme (MCS) for transmitting the interference autocorrelation matrix report, and wherein the first MCS is lower relative to a second MCS that is associated with transmitting absolute autocorrelation matrix information.

Aspect 49: An apparatus for wireless communication at a device, comprising a processor; one or more memories coupled with the processor; and instructions stored in the one or more memories and executable by the processor to cause the apparatus to perform the method of one or more of Aspects 1-48.

Aspect 50: A device for wireless communication, comprising one or more memories and one or more processors coupled to the one or more memories, the one or more processors configured to perform the method of one or more of Aspects 1-48.

Aspect 51: An apparatus for wireless communication, comprising at least one means for performing the method of one or more of Aspects 1-48.

Aspect 52: A non-transitory computer-readable medium storing code for wireless communication, the code comprising instructions executable by a processor to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured, individually or collectively, to:
      receive an indication of an interference prediction configuration, wherein the interference prediction configuration indicates selection of a prediction mode; and
      transmit an interference prediction report based at least in part on the interference prediction configuration.

2. The apparatus of claim 1, wherein the interference prediction configuration indicates a switching threshold that is associated with switching from a first prediction mode to a second prediction mode.

3. The apparatus of claim 1, wherein the interference prediction configuration comprises an interference reporting configuration.

4. The apparatus of claim 1, wherein the one or more processors are further configured to:
   transmit a second indication of a UE-selected prediction mode,
      wherein the interference prediction configuration indicates the UE-selected prediction mode.

5. The apparatus of claim 1, wherein the one or more processors are further configured to:
   transmit UE-capability information that indicates one or more UE-supported interference prediction capabilities,
      wherein the interference prediction configuration is based at least in part on the one or more UE-supported interference prediction capabilities.

6. The apparatus of claim 1, wherein the interference prediction configuration indicates an interference reporting configuration, and
   wherein the interference reporting configuration indicates to return an interference autocorrelation matrix report.

7. The apparatus of claim 6, wherein the one or more processors are further configured to:
   receive an uplink grant associated with transmission of at least one of:
      the interference autocorrelation matrix report, or
      the interference prediction report.

8. The apparatus of claim 6, wherein the interference reporting configuration indicates a priority associated with transmission of the interference autocorrelation matrix report.

9. The apparatus of claim 6, wherein the interference reporting configuration indicates to multiplex the interference autocorrelation matrix report with a scheduled uplink transmission.

10. The apparatus of claim 6, wherein the interference reporting configuration indicates to transmit the interference autocorrelation matrix report based at least in part on differential autocorrelation matrix information.

11. An apparatus for wireless communication at a network node, comprising:
   one or more memories; and
   one or more processors, coupled to the one or more memories, configured, individually or collectively, to:
      transmit an indication of an interference prediction configuration, wherein the interference prediction configuration indicates selection of a prediction mode; and
      receive an interference prediction report based at least in part on the interference prediction configuration.

12. The apparatus of claim 11, wherein the interference prediction configuration comprises an interference reporting configuration.

13. The apparatus of claim 11, wherein the one or more processors are further configured to:
   receive a second indication of a UE-selected prediction mode, wherein the interference prediction configuration is based at least in part on the UE-selected prediction mode.

14. The apparatus of claim 11, wherein the one or more processors are further configured to:
   receive UE-capability information that indicates one or more UE-supported interference prediction capabilities,
      wherein the interference prediction configuration is based at least in part on the one or more UE-supported interference prediction capabilities.

15. The apparatus of claim 11, wherein the interference prediction configuration indicates an interference reporting configuration, and
   wherein the interference reporting configuration indicates to return an interference autocorrelation matrix report.

16. The apparatus of claim 15, wherein the one or more processors are further configured to:
   transmit an uplink grant associated with transmission of at least one of:
      the interference autocorrelation matrix report, or
      the interference prediction report.

17. The apparatus of claim 15, wherein the interference reporting configuration indicates a trigger event associated with transmission of the interference autocorrelation matrix report.

18. The apparatus of claim 15, wherein the interference reporting configuration indicates a priority associated with transmission of the interference autocorrelation matrix report.

19. The apparatus of claim 15, wherein the interference reporting configuration indicates to multiplex the interference autocorrelation matrix report with a scheduled uplink transmission.

20. A method of wireless communication performed by a user equipment (UE), comprising:
   receiving an indication of an interference prediction configuration, wherein the interference prediction configuration indicates selection of a prediction mode; and
   transmitting an interference prediction report based at least in part on the interference prediction configuration.

21. The method of claim 20, wherein the prediction mode comprising comprises at least one of:
   a trace of an interference autocorrelation matrix prediction mode,
   a diagonal interference autocorrelation matrix prediction mode, or
   a full interference autocorrelation matrix prediction mode.

22. The method of claim 20, wherein the interference prediction configuration comprises an interference reporting configuration.

23. The method of claim 22, wherein the interference reporting configuration indicates to return a multi-part interference report.

24. The method of claim 23, wherein the multi-part interference report comprises:
   a first report that is associated with one or more predicted interference power metrics, and
   a second report that is associated with one or more predicted correlation metrics associated with interference.

25. The method of claim 24, wherein the interference reporting configuration indicates a respective priority for each report of the multi-part interference report.

26. The method of claim 20, wherein the interference prediction configuration indicates an interference reporting configuration, and
   wherein the interference reporting configuration indicates to return an interference autocorrelation matrix report.

27. A method of wireless communication performed by a network node, comprising:
   transmitting an indication of an interference prediction configuration, wherein the interference prediction configuration indicates selection of a prediction mode; and
   receiving an interference prediction report based at least in part on the interference prediction configuration.

28. The method of claim 27, wherein the interference prediction configuration
   a switching threshold that is associated with switching from a first prediction mode to a second prediction mode.

* * * * *